US011854401B2

(12) United States Patent
Wu et al.

(10) Patent No.: US 11,854,401 B2
(45) Date of Patent: *Dec. 26, 2023

(54) TEMPORAL INFORMATION PREDICTION IN AUTONOMOUS MACHINE APPLICATIONS

(71) Applicant: NVIDIA Corporation, Santa Clara, CA (US)

(72) Inventors: Yue Wu, Mountain View, CA (US); Pekka Janis, Uusimaa (FI); Xin Tong, Santa Clara, CA (US); Cheng-Chieh Yang, Sunnyvale, CA (US); Minwoo Park, Saratoga, CA (US); David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,176

(22) Filed: Dec. 16, 2022

(65) Prior Publication Data

US 2023/0122119 A1 Apr. 20, 2023

Related U.S. Application Data

(63) Continuation of application No. 16/514,404, filed on Jul. 17, 2019, now Pat. No. 11,579,629.

(Continued)

(51) Int. Cl.
*G08G 1/16* (2006.01)
*G06V 10/82* (2022.01)
(Continued)

(52) U.S. Cl.
CPC .......... *G08G 1/166* (2013.01); *G05D 1/0088* (2013.01); *G05D 1/0289* (2013.01);
(Continued)

(58) Field of Classification Search
CPC .... G08G 1/166; G05D 1/0088; G05D 1/0289; G05D 2201/0213; G06F 18/214;
(Continued)

(56) References Cited

U.S. PATENT DOCUMENTS

| 10,885,698 B2 | 1/2021 | Muthler et al. |
| 11,579,629 B2 | 2/2023 | Wu et al. |
| 2008/0046181 A1* | 2/2008 | Koike ................ G06V 20/58 |
| | | 701/301 |

(Continued)

FOREIGN PATENT DOCUMENTS

WO    WO-2020058560 A1 *  3/2020  .......... G05B 13/027

OTHER PUBLICATIONS

Yao, Yu, et al. "Egocentric Vision-based Future Vehicle Localization for Intelligent Driving Assistance Systems" arXiv prepring arXiv:1809.07408 (2018). https://arxiv.org/pdf/1809.07408.pdf.

(Continued)

*Primary Examiner* — Hunter B Lonsberry
*Assistant Examiner* — Harrison Heflin
(74) *Attorney, Agent, or Firm* — Taylor English Duma L.L.P.

(57) ABSTRACT

In various examples, a sequential deep neural network (DNN) may be trained using ground truth data generated by correlating (e.g., by cross-sensor fusion) sensor data with image data representative of a sequences of images. In deployment, the sequential DNN may leverage the sensor correlation to compute various predictions using image data alone. The predictions may include velocities, in world space, of objects in fields of view of an ego-vehicle, current and future locations of the objects in image space, and/or a time-to-collision (TTC) between the objects and the ego-vehicle. These predictions may be used as part of a percep- (Continued)

tion system for understanding and reacting to a current physical environment of the ego-vehicle.

20 Claims, 20 Drawing Sheets

Related U.S. Application Data

(60) Provisional application No. 62/819,412, filed on Mar. 15, 2019.

(51) Int. Cl.
| | | |
|---|---|---|
| *G06V 20/58* | (2022.01) | |
| *G06V 20/10* | (2022.01) | |
| *G06F 18/214* | (2023.01) | |
| *G05D 1/00* | (2006.01) | |
| *G05D 1/02* | (2020.01) | |
| *G06N 3/04* | (2023.01) | |
| *G06T 7/20* | (2017.01) | |

(52) U.S. Cl.
CPC ......... *G06F 18/214* (2023.01); *G06N 3/0418* (2013.01); *G06T 7/20* (2013.01); *G06V 10/82* (2022.01); *G06V 20/10* (2022.01); *G06V 20/58* (2022.01); *G05D 2201/0213* (2013.01)

(58) Field of Classification Search
CPC ........ G06N 3/0418; G06T 7/20; G06V 10/82; G06V 20/10; G06V 20/58
See application file for complete search history.

(56) References Cited

U.S. PATENT DOCUMENTS

| | | | |
|---|---|---|---|
| 2016/0260328 A1* | 9/2016 | Mishra | G01S 13/931 |
| 2019/0025843 A1* | 1/2019 | Wilkinson | G05D 1/0088 |
| 2020/0026282 A1* | 1/2020 | Choe | B60W 60/001 |
| 2020/0192352 A1* | 6/2020 | Rastoll | G05D 1/0044 |

OTHER PUBLICATIONS

Remy, Phillipe, "Stateful LSTM in Keras", Jul. 30, 2016. http://philipperemy.github.ic/keras-stateful-lstm/.

IEC 61508, "Functional Safety of Electrical/Electronic/Programmable Electronic Safety-related Systems, " https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

Notice of Allowance for U.S. Appl. No. 16/514,404, filed 07/17/20219, dated Oct. 19, 2022, 10 pgs.

"Taxonomy and Definitions for Terms Related to Driving Automation Systems for On-Road Motor Vehicles", Society of Automotive Engineers (SAE), Standard No. J3016-201609, p. 30 (Sep. 30, 2016).

"Taxonomy and Definitions for Terms Related to Driving Automation Systems for On-Road Motor Vehicles", Society of Automotive Engineers (SAE), Standard No. J3016-201806, p. 35 (Jun. 15, 2018).

* cited by examiner

1300

SELECT A FIRST SEQUENCE OF IMAGES FOR A FIRST FEATURE VECTOR OF A FIRST MINI-BATCH AND A SECOND SEQUENCE OF IMAGES FOR A SECOND FEATURE VECTOR OF A SECOND MINI-BATCH IMMEDIATELY SUBSEQUENT THE FIRST MINI-BATCH, FIRST IMAGES IN THE FIRST SEQUENCE OF IMAGES AND THE SECOND SEQUENCE OF IMAGES BEING ORDERED CONSECUTIVELY AT A FIRST STRIDE
B1302

SELECT A THIRD SEQUENCE OF IMAGES FOR A THIRD FEATURE VECTOR OF THE FIRST MINI-BATCH AND A FOURTH SEQUENCE OF IMAGES FOR A FOURTH FEATURE VECTOR OF THE SECOND MINI-BATCH, SECOND IMAGES IN THE THIRD SEQUENCE OF IMAGES AND THE FOURTH SEQUENCE OF IMAGES BEING ORDERED NON-CONSECUTIVELY
B1304

APPLY THE FIRST MINI-BATCH AND THE SECOND MINI-BATCH TO A NEURAL NETWORK DURING TRAINING
B1306

FIGURE 13

TEMPORAL INFORMATION PREDICTION IN AUTONOMOUS MACHINE APPLICATIONS

CROSS-REFERENCE TO RELATED APPLICATIONS

This application is a continuation of U.S. patent application Ser. No. 16/514,404, filed Jul. 17, 2019 which claims the benefit of U.S. Provisional Application No. 62/819,412, filed on Mar. 15, 2019. Each of which is hereby incorporated by reference in its entirety.

BACKGROUND

The ability to accurately predict temporal information is critical to generating a world model for obstacle analysis and for aiding in control determinations for a vehicle. For example, temporal information predictions may be generated as part of a perception layer of an autonomous driving software stack, and may be used by a world model manager—in addition to mapping, localization, and other perception functions—to aid the vehicle in understanding the environment. The temporal information predictions may also serve as an essential input to advanced driver assistance systems (ADAS), such as automatic emergency braking (AEB) and adaptive cruise control (ACC).

Some conventional systems have used conventional computer vision algorithms—such as tracking algorithms—to estimate changes in local appearance to extract local motion information that can be used to generate temporal information estimations. However, these computer vision algorithms are sensitive to, as non-limiting examples, non-rigid motion and viewing direction (e.g., rotation of obstacles), which may lead to inferior predictions—especially for object types such as pedestrians. The context of objects or obstacles in the environment are also not accounted for using conventional computer vision algorithms, so prevailing algorithms are typically unable to capture or create an understanding of how an object or obstacle appears to be moving in relation to its static surroundings. In addition, these algorithms are executed using simple internal mechanisms that rely on fixed time baselines to compute temporal information—thereby not separately accounting for different objects, scenarios, and/or conditions in the environment and resulting in less informative and accurate predictions.

SUMMARY

Embodiments of the present disclosure relate to temporal information prediction for perception in autonomous machine applications. Systems and methods are disclosed that relate to using a sequential deep neural network (DNN)—e.g., a recurrent neural network (RNN)—to predict a time-to-collision (TTC), two-dimensional (2D) object motion, and three-dimensional (3D) object motion for use in autonomous machine applications.

In contrast to conventional systems, such as those described above, the system of the present disclosure uses correlations between sensor data and image data to generate ground truth data for training a sequential DNN to predict—in deployment—TTC, 2D object motion, and 3D object motion without requiring sensor data as an input. As a result, the sequential DNN is able to generate predictions from the images alone, without requiring dense optical flow or motion of the vehicle during deployment to generate predictions—as was required in conventional systems. In order to generate accurate results during deployment without requiring sensor data inputs, the system of the present disclosure leverages an automatic ground truth data generation pipeline using cross-sensor fusion, a dedicated preprocessing step to filter out inconsistent ground truth or training data, temporal augmentation of training data to increase robustness of the training data set, and post-processing steps to smooth predictions.

In addition, depending on the implementation of the sequential DNN, the present system implements stateless or stateful training and inference methods that improve accuracy and computation efficiency of the system. For example, stateless inference methods are described that leverage prior computations or execute parallel computations to improve run-time efficiency and accuracy of predictions of the sequential DNN. As another example, stateful training methods are described that reduce the likelihood of overfitting to a training data set by randomizing sequence lengths, stride, and/or direction of frames in mini-batches of a training data set.

BRIEF DESCRIPTION OF THE DRAWINGS

The present systems and methods for temporal information prediction for perception in autonomous machine applications is described in detail below with reference to the attached drawing figures, wherein:

FIG. 13 is a flow diagram showing a method for stateful training, in accordance with some embodiments of the present disclosure;

DETAILED DESCRIPTION

Figure 1:
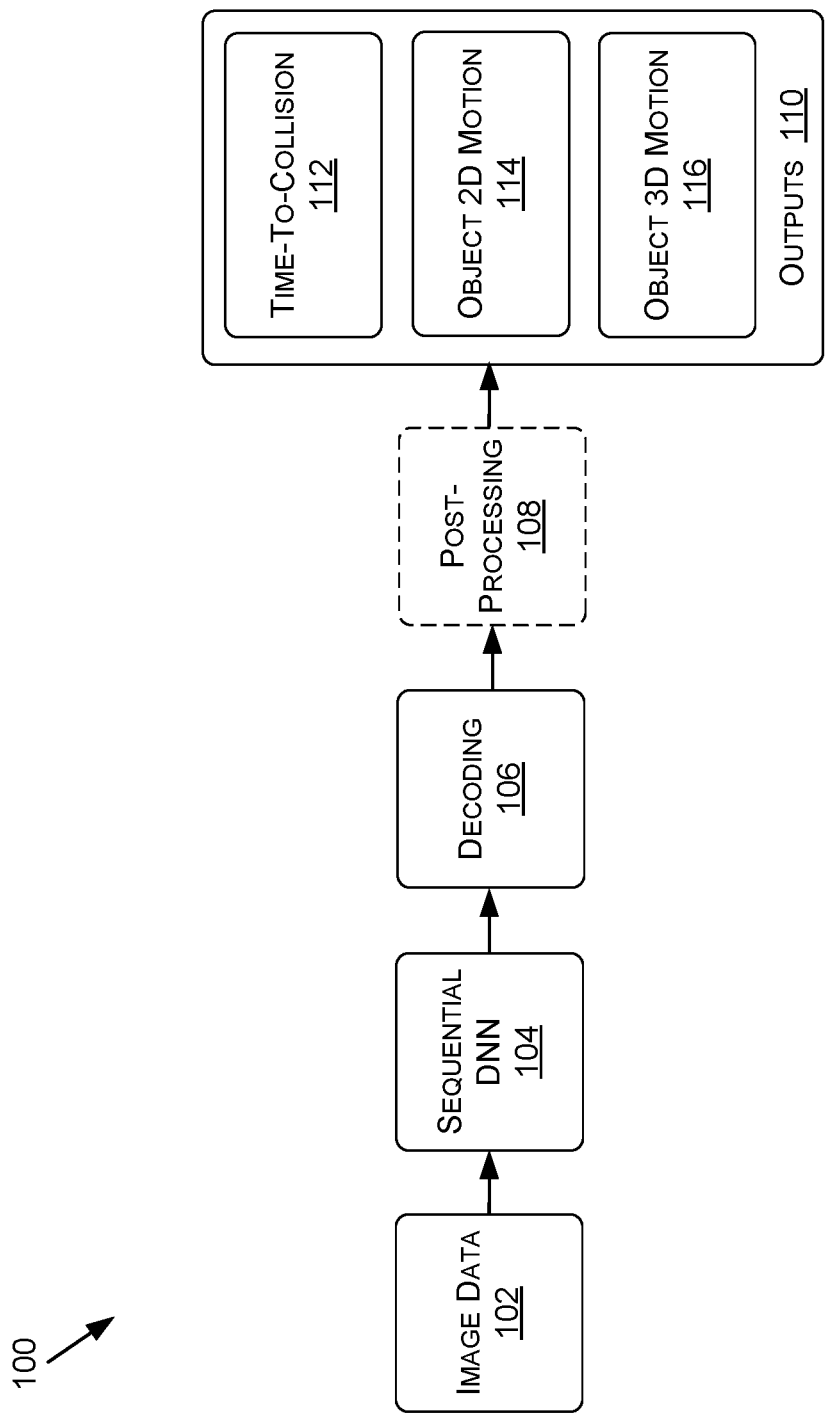
FIG. 1 is a data flow diagram illustrating an example process for temporal predictions of objects in an environment, in accordance with some embodiments of the present disclosure.

Systems and methods disclosed herein relate to temporal information prediction for perception in autonomous machine applications. Although the present disclosure may be described with respect to an example autonomous vehicle 1400 (alternatively referred to herein as "vehicle 1400" or "autonomous vehicle 1400," an example of which is described with respect to FIGS. 14A-14D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, this is not intended to be limiting. For example, the systems and methods described herein may be used in robotics, aerial systems, boating systems, and/or other technology areas, such as for perception, world model management, path planning, obstacle avoidance, and/or other processes.

Temporal Predictions Using a Sequential Deep Neural Network

Deep neural network(s) (DNN(s)) of the present disclosure may be trained using image data correlated with sensor data (e.g., LIDAR data, RADAR data, etc.), such as by using cross-sensor fusion techniques. The DNN(s) may include a recurrent neural network (RNN), which may have one or more long short term memory (LSTM) layers and/or gated recurrent unit (GRU) layers. As a result, the DNN(s) may be trained—using a combination of image data and sensor data—to predict temporal information such as time-to-collision (TTC), two-dimensional (2D) motion, and/or three-dimensional (3D) motion corresponding to objects in an environment. In contrast to conventional systems, and as a result of the training methods described herein, the DNN(s) may be configured to generate accurate predictions of temporal information in deployment using only image data (e.g., an RNN in deployment may learn to generate temporal information with the accuracy of supplemental sensor data without requiring the supplemental sensor data).

The image data used to train the DNN(s) may be representative of a sequence of images, and the sequence of images may be applied to the DNN(s). The DNN(s) may then predict, as outputs, data representative of a current location of an object and one or more future locations of an object (e.g., as bounding box locations), and/or data representative of a velocity of an object. A scale change between bounding shapes at current and future locations of the object may be used to generate an urgency prediction that corresponds to the inverse of TTC (e.g., 1/TTC). By training the DNN(s) to predict the inverse of TTC, outputs that push to infinity (e.g., where relative motion between the ego-vehicle and another vehicle is zero) may be valued closer to zero (e.g., effectively removed), thereby resulting in more effective processing and usability of the predicted values. In addition, during training, the use of the inverse of TTC is more conducive to gradient descent-based optimization methods. The image data may include timestamps (e.g., corresponding to a frame rate), and the timestamps (or frame rate) may be used by the system in addition to the scale change. For example, the timestamps (or frame rate) and the scale change may be used to generate the urgency or the TTC (e.g., TTC may be expressed or represented as equal to, or approximately equal to, $\Delta t / \Delta s$, where t is a time between capture of two frames and s is a scale change between the bounding shapes for an object in the two frames). In some examples, the DNN(s) may implicitly account for the $\Delta t$, such that the output of the DNN(s) may be directly usable with minimal post-processing (e.g., without having to use the frame rate in a post-processing calculation to generate the final prediction for TTC). In other examples, the DNN(s) may be trained to output the $\Delta s$ value, and the post-processing may be used to determine the TTC using the value of $\Delta t$ (e.g., where the DNN(s) do not implicitly account for $\Delta t$).

In some examples, the current and future locations may be output by the DNN(s) as locations of origins, or centers, of bounding shapes in addition to dimension information (e.g., lengths of sides of the bounding shape). In other examples, the current location may be output as a location of an origin or center of a bounding shape in addition to dimension information, and the future location may be output as a translation from the origin, or center, of the current bounding shape in addition to a scale change value for the bounding shape dimensions. The velocity information may be calculated for the object by looking at the timestamps and the change in location of the object across images in the sequence of images.

Once the outputs are predicted by the DNN(s), the outputs may be decoded. For example, where 1/TTC is computed, the 1/TTC value may be converted to TTC. Where the current and future locations are predicted, the outputs may be used to generate the bounding shapes (e.g., to associate the bounding shapes with corresponding pixel locations in the images). In addition, in some examples, temporal smoothing may be applied to one or more of the outputs. The temporal smoothing may include a state estimator such as a Kalman filter. The temporal smoothing may be applied in image space or may be applied in 3D world space relative to the ego-vehicle, 3D world space relative to some fixed origin in world space, or in a birds-eye view in 2D world space.

Now referring to FIG. 1, FIG. 1 is a data flow diagram illustrating an example process 100 for temporal predictions of objects in an environment, in accordance with some embodiments of the present disclosure. At a high level, the process 100 may include one or more sequential deep neural networks (DNNs) 104 receiving one or more inputs, such as image data 102, and generating one or more outputs 110, such as a time-to-collision (TTC) 112, object two-dimensional (2D) motion 114, and/or object three-dimensional (3D) motion 116. The image data 102 may include image data generated by one or more cameras of an autonomous vehicle (e.g., vehicle 1400, as described herein at least with respect to FIGS. 14A-14D). In some embodiments, in addition to or alternatively from the image data 102, the sequential DNN 104 may use LIDAR data from one or more LIDAR sensors 1464, RADAR data from one or more RADAR sensors 1460, SONAR data from one or more SONAR sensors, data from one or more ultrasonic sensor(s) 1462, audio data from one or more microphones 1496, etc.

The sequential DNN(s) 104 may be trained to generate the TTC 112, the object 2D motion 114, and/or the object 3D motion 116. These outputs 110 may be used by a world model manager (e.g., a world model manager layer of an autonomous driving software stack), perception component(s) (e.g., a perception layer of the autonomous driving software stack), planning component(s) (e.g., a planning layer of the autonomous driving software stack), obstacle avoidance component(s) (e.g., an obstacle or collision avoidance layer of the autonomous driving software stack), and/or other components or layers of the autonomous driving software stack to aid the autonomous vehicle 1400 in performing one or more operations (e.g., world model management, obstacle avoidance, path planning, etc.) within an environment.

In some embodiments, the image data 102 may include data representative of images of a field of view of one or more cameras of a vehicle, such as stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, and/or other camera type of the autonomous vehicle 1400 (FIGS. 14A-14D). In some non-limiting examples, one or more forward-facing cameras and/or one or more side-facing cameras may be used. The image data 102 captured from a forward-facing and/or a side-facing perspective may be useful for perception when navigating—e.g., within a lane, through a lane change, through a turn, through an intersection, etc.—because a forward-facing camera and/or a side-facing camera may include fields of view that include both a current lane of travel of the vehicle 1400, adjacent lane(s) of travel of the vehicle 1400, oncoming lanes of travel of other objects, pedestrian areas, and/or boundaries of the driving surface. In some examples, more than one camera or other sensor (e.g., LIDAR sensor, RADAR sensor, etc.) may be used to incorporate multiple fields of view (e.g., the fields of view of the long-range cameras 1498, surround cameras 1474, the forward-facing stereo camera 1468, and/or the forward facing wide-view camera 1470 of FIG. 14B).

In some examples, the image data 102 may be captured in one format (e.g., RCCB, RCCC, RBGC, etc.), and then converted (e.g., during pre-processing of the image data) to another format. In some other examples, the image data may be provided as input to an image data pre-processor (not shown) to generate pre-processed image data. Many types of images or formats may be used as inputs, for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. In some examples, different formats and/or resolutions could be used for training the sequential DNN(s) 104 than for inferencing (e.g., during deployment of the sequential DNN(s) in the autonomous vehicle 1400).

The image data pre-processor may use image data 102 representative of one or more images (or other data representations) and load the image data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the sequential DNN(s) 104.

In some embodiments, a pre-processing image pipeline may be employed by the image data pre-processor to process a raw image(s) acquired by camera(s) and included in the image data 102 to produce pre-processed image data which may represent an input image(s) to the input layer(s) of the sequential DNN(s) 104. An example of a suitable pre-processing image pipeline may use a raw RCCB Bayer (e.g., 1-channel) type of image from the camera and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the image data pre-processor, it may include bilateral denoising in the Bayer domain. Where demosaicing is employed by the image data pre-processor, it may include bilinear interpolation. Where histogram computing is employed by the image data pre-processor, it may involve computing a histogram for the C channel, and may be merged with the decompanding or noise reduction in some examples. Where adaptive global tone mapping is employed by the image data pre-processor, it may include performing an adaptive gamma-log transform. This may include calculating a histogram, getting a mid-tone level, and/or estimating a maximum luminance with the mid-tone level.

The sequential DNN(s) 104 may include a recurrent neural network (RNN), a gated recurrent unit (GRU) DNN, a long short term memory (LSTM) DNN, and/or another type of sequential DNN 104 (e.g., a DNN that uses sequential data, such as sequences of images, as inputs). Although examples are described herein with respect to using sequential DNNs, and specifically RNNs, LSTMs, and/or GRUs, as the sequential DNN(s) 104, this is not intended to be limiting. For example, and without limitation, the sequential DNN(s) 104 may more broadly include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, LSTM, GRU, Hopfield, Boltzmann, deep belief, deconvolutional, generative adversarial, liquid state machine, etc.), and/or other types of machine learning models.

Figure 2:
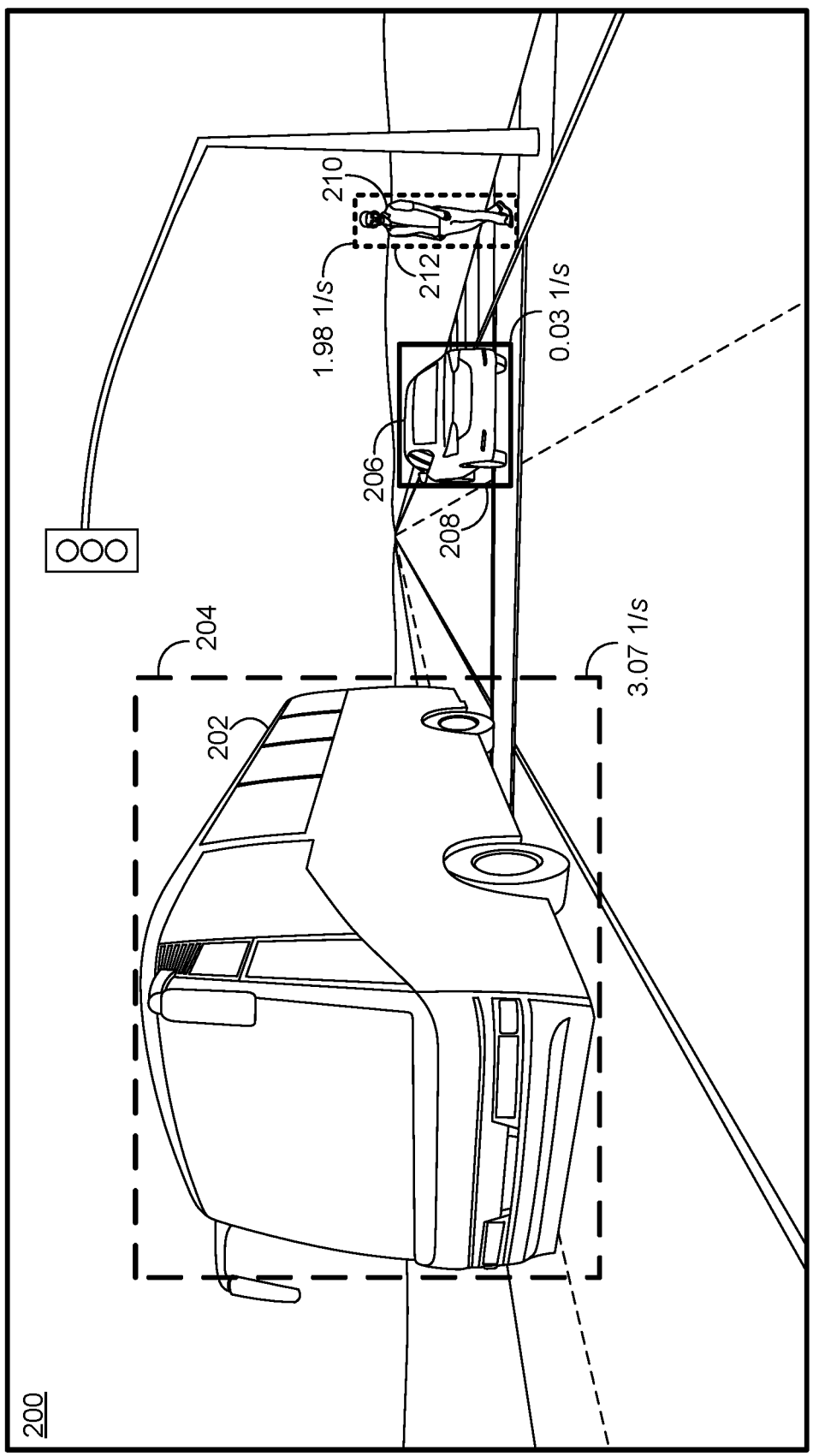
FIGS. 2-3 are example visualizations of a temporal information predictions of a sequential deep neural network (DNN), in accordance with some embodiments of the present disclosure.

The sequential DNN 104 may generate or predict output data that may undergo decoding 106 and, in some embodiments, post-processing 108 (e.g., temporal smoothing) to ultimately generate the outputs 110. The TTC 112 information may be output, for each detected object in the image data 102, as a value of 1/TTC represented in units of 1/seconds (s). For example, with respect to visualization 200 of FIG. 2, the sequential RNN 104 may predict a value of 3.07 1/s for a bus 202, a value of 0.03 1/s for a vehicle 206, and a value of 1.98 1/s for a pedestrian 210. The sequential DNN 104 may also predict a bounding shape for each of the objects in the image, such as bounding shape 204 for the bus 202, bounding shape 208 for the vehicle 206, and bounding shape 212 for the pedestrian 210. In the visualization 200, the bounding shapes may be represented with borders with different display variations to indicate urgency (e.g., how imminent a crossing of paths is for the vehicle 1400 and the object). For example, the bounding shape 204 may be indicated by a first dashed line type, to indicate a medium urgency, the bounding shape 212 may be indicated by a second dashed line type, to indicate a high urgency, and the bounding shape 208 may be represented by a solid line to indicate a low urgency. Although illustrated with dashes and solid lines in the visualization 200, this is not intended to be limiting. In some embodiments, urgency may be expressed with displays using different colors, patterns, display frequencies, shapes, line-types, and/or other visual indicators may be used to indicate the relative urgency. As a result of the output of the sequential RNN 104 including a value for 1/TTC, the decoding may include retrieving the value, and converting the value to the TTC 112 (e.g., by diving the 1 by the value). The values for 1/TTC or TTC 112 may undergo post-processing in some embodiments, as described in more detail herein, such as to smooth the values temporally. Depending on the embodiment, the vehicle 1400 may use the value for 1/TTC or may use the value for the TTC 112 to perform one or more operations such as, without limitation, world model management, path planning, and/or obstacle avoidance.

Although TTC includes "collision," this is not intended to be literal. For example, the TTC may be an indicator of when the vehicle 1400 (e.g., the ego-vehicle) and the object in the environment will meet along the horizontal (e.g., where the object in the environment will meet a plane that is vertical with respect to a ground plane and parallel with, for example, a rear axle of the vehicle 1400), but should not be interpreted as an indication of an actual collision. For example, with reference to FIG. 2, the bus 202 may be traveling in an opposite direction of the vehicle 1400 (e.g., the ego-vehicle whose camera captured the image used in the visualization 200) on the opposite side of the road. As such, so long as both the vehicle 1400 and the bus 202 stay in their respective lanes, there will be no collision. Similarly, with respect to the vehicle 1400 and the vehicle 206, so long as both vehicles stay in their lanes, there will be no collision—simply an overlap or crossing by both vehicles of a plane extending between the two vehicles in the horizontal (e.g., from a right of the page to the left of the page with respect to FIG. 2).

The object 2D motion 114 may be output, for each detected object in each image, as a location (e.g., a pixel (x, y) coordinate) of an origin or center of a bounding shape in 2D image space and dimensions of the bounding shape (e.g., length and width for a bounding box measured in 2D pixel distances) for a current location of the object. In some examples, to determine one or more future positions of the object, the sequential DNN 104 may output a translation value (e.g., an x and y translation in pixel distance) in 2D image space for the origin as well as a change in scale size for the dimensions. As such, the values for the current bounding shape and the values for translation and change in scale size may be used to determine (e.g., during decoding 106) the location in 2D image space and size in 2D image space of the future bounding shape. In other examples, to determine one or more future positions of the object, a future bounding shape origin and future dimensions of the future bounding shape may be output by the sequential DNN 104. In either example, decoding 106 may be executed on the outputs of the sequential DNN 104 to determine the locations in 2D image space of the current and future bounding shapes for each object in order to track or determine the object 2D motion 114. As described herein, in some examples, the values output by the sequential DNN 104 and/or the values after decoding may undergo post-processing, such as to smooth the values temporally.

Figure 3:
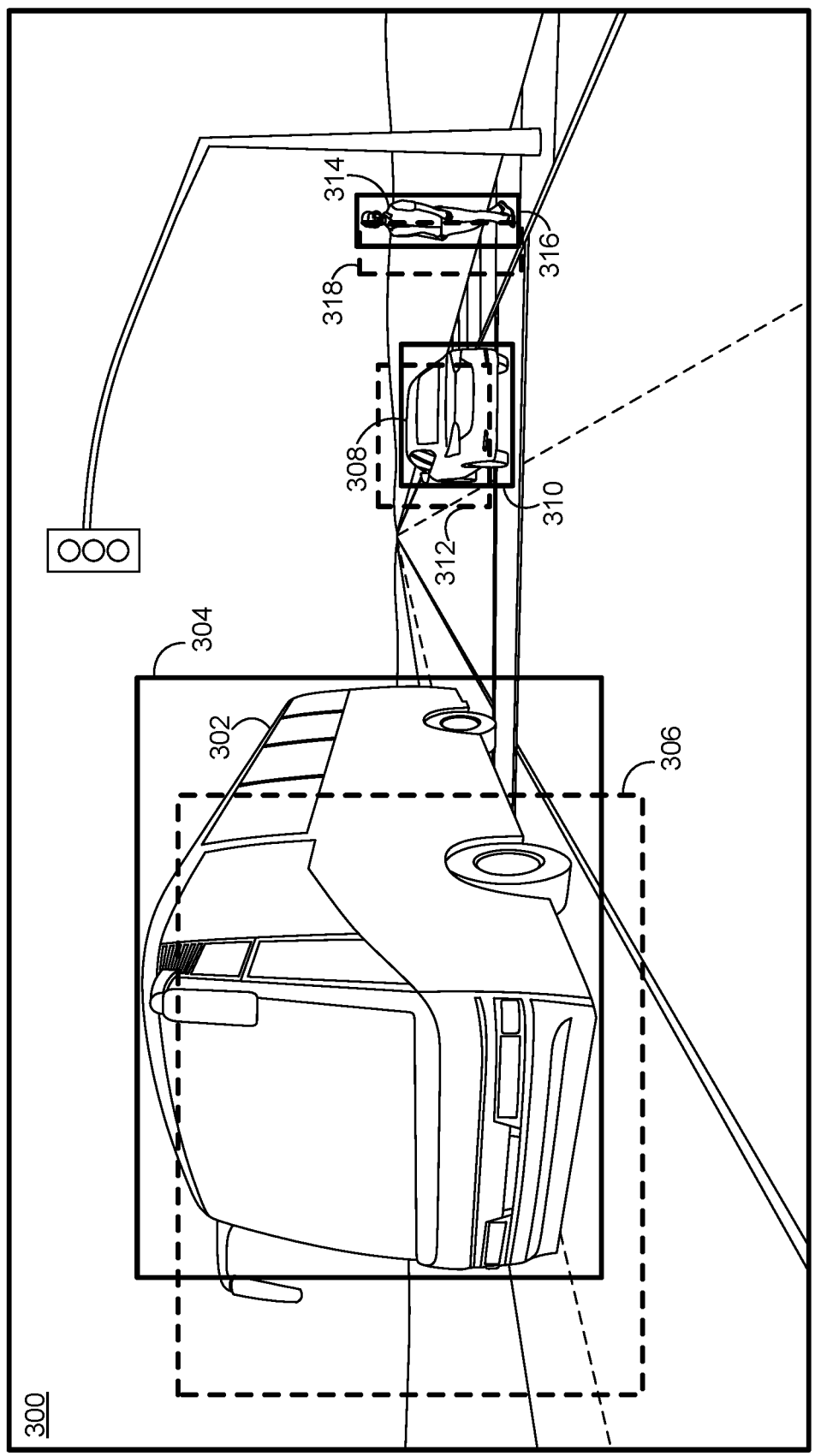

As a non-limiting example, and with respect to FIG. 3, visualization 300 includes a bus 302, a vehicle 308, and a pedestrian 314 with respective current bounding shapes (indicated by solid lines) and future bounding shapes (indicated by dashed lines). For example, the bus 302 has a current bounding shape 304 and a future bounding shape 306 generated based on the outputs of the object 2D motion 116 of the sequential DNN 104. The car 308 has a current bounding shape 310 and a future bounding shape 312 generated based on the outputs of the object 2D motion 116 of the sequential DNN 104. Similarly, the pedestrian 314 has a current bounding shape 316 and a future bounding shape 318 generated based on the outputs of the object 2D motion 116 of the sequential DNN 104. The object 2D motion 114 may be used to determine future locations of the objects in the field of view of the camera, and with respect to each image in a sequence of images. The object 2D motion—including the object future locations—may be used to aid an autonomous driving software stack in determining where the objects may be at future times (e.g., merging, changing lanes, staying in lanes, swerving, etc.), thereby assisting with obstacle avoidance, path planning, world model generation, and/or other processes or operations of the vehicle 1400.

The object 3D motion 116 may be output, for each detected object in each image, as a three dimensional array including a velocity in the x direction, a velocity in the y direction, and a velocity in the z direction in world space. As such, the sequential DNN 104 may be trained—using cross-sensor fusion of LIDAR data and RADAR data with image data—to generate a 3D velocity vector as an output that corresponds to the object 3D motion 116 for one or more objects in the image. As such, the sequential DNN 104 may be trained to use changes in locations of objects within sequences of images as well as timestamps (e.g., to determine time between each consecutive image) to learn 3D velocities of the objects. Thus, the sequential DNN 104 is able to leverage sensor data (e.g., LIDAR data, SONAR data, etc.) used during training to predict 3D velocities of objects in deployment without the requirement of receiving the sensor data as an input. The object 3D motion 116 may be used to aid an autonomous driving software stack in obstacle avoidance, path planning, world model generation, and/or other processes or operations of the vehicle 1400. As described herein, in some examples, the values output by the sequential DNN 104 and/or the values after decoding may undergo post-processing, such as to smooth the values temporally.

The post-processing 108 may include, as described herein, temporal smoothing. For example, the temporal smoothing may include a state estimator such as a Kalman filter. The temporal smoothing may be applied in image space or may be applied in 3D world space relative to the vehicle 1400, 3D world space relative to some fixed origin in world space, or in a birds-eye view in 2D world space.

Figure 4:
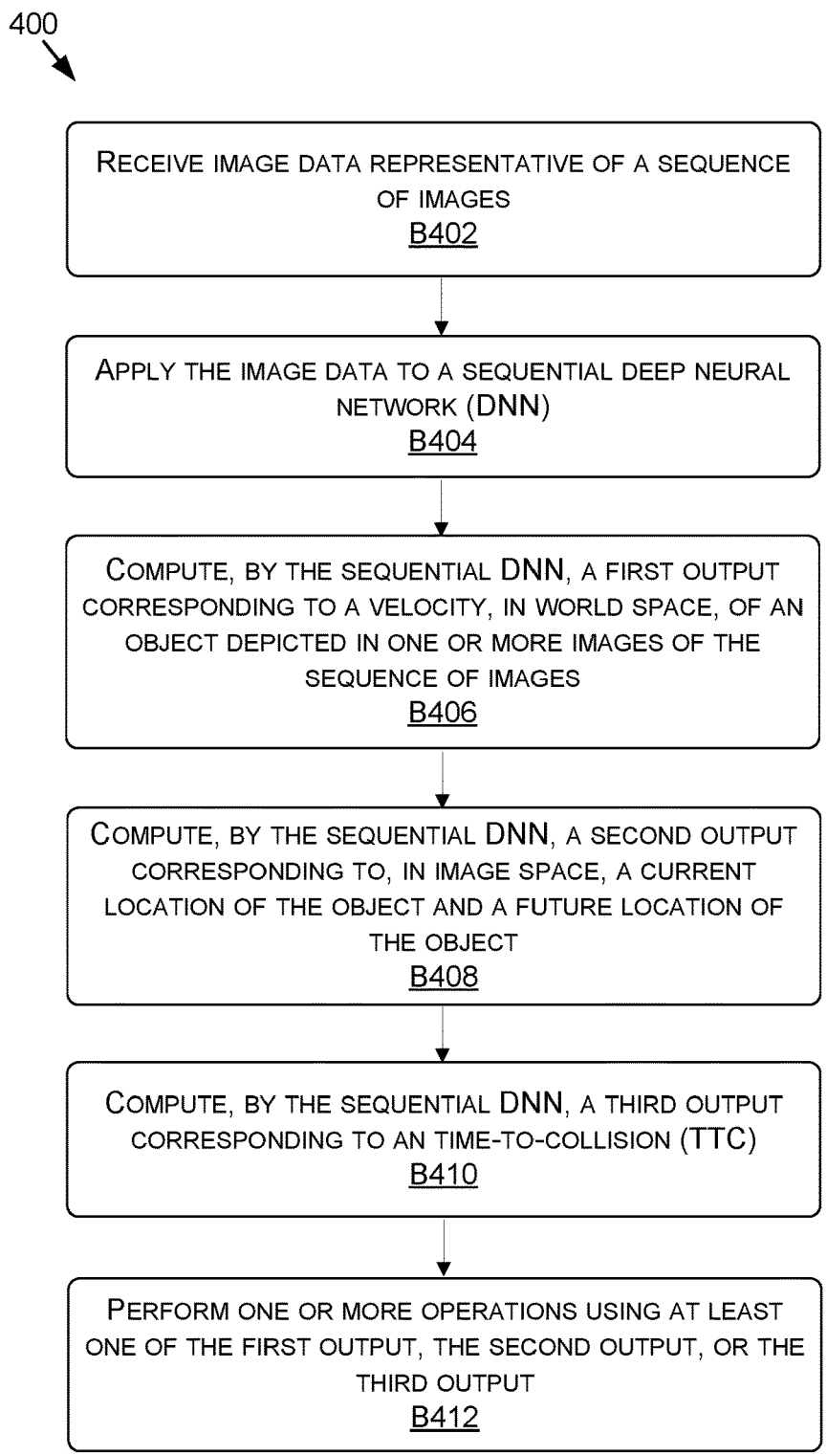
FIG. 4 is a flow diagram showing a method 400 for temporal information prediction using a sequential DNN, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the process 100 of FIG. 1. However, the method 400 may additionally or alternatively be executed by any one system, or any combination of systems, within any one process, or any combination of processes, including, but not limited to, those described herein.

FIG. 4 is a flow diagram showing a method 400 for temporal information prediction using a sequential DNN, in accordance with some embodiments of the present disclosure. The method 400, at block B402, includes receiving image data representative of a sequence of images. For example, the image data 102 may be received, where the image data 102 is representative of a sequence of images (e.g., captured by one or more cameras on the vehicle 1400).

The method 400, at block B404, includes applying the image data to a sequential deep neural network (DNN). For example, the image data 102 may be applied to the sequential DNN 104. As described herein, because the sequential DNN 104 may be trained by applying cross-sensor fusion or another sensor data to an image data correlation technique(s), the sequential DNN 104 may be able to predict temporal information with only the image data 102 as an input.

The method 400, at block B406, includes computing, by the sequential DNN, a first output corresponding to a velocity, in world space, of an object depicted in one or more images of the sequence of images. For example, the sequential DNN 104 may predict the object 3D motion 116, as described herein.

The method 400, at block 408, includes computing, by the sequential DNN, a second output in image space corresponding to a current location of the object and a future location of the object. For example, the sequential DNN 104 may predict the object 2D motion 114, as described herein.

The method 400, at block B410, includes computing, by the sequential DNN, a third output corresponding to a time-to-collision (TTC). For example, the sequential DNN 104 may predict an inverse of TTC (e.g., 1/TTC), and the 1/TTC value may be converted to the TTC 112. In other examples, the sequential DNN 104 may trained to predict the TTC 112 directly, or the inverse of TTC may be used by the system.

In some embodiments, one or more of blocks B406, B408, and B410 may be executed in parallel (e.g., using parallel processing). As a result, the run-time may be decreased while maintaining accuracy.

The method 400, at block B412, includes performing one or more operations using at least one of the first output, the second output, or the third output. For example, the vehicle 1400 (or an autonomous driving software stack thereof) may perform one or more operations using the TTC 112, the object 2D motion 114, and/or the object 3D motion 116. The one or more operations may include, without limitation, world model management, path planning, vehicle control, and/or obstacle or collision avoidance.

Stateless Inference for a Sequential Deep Neural Network

The stateless inference applications described herein may be used in any inference method for any sequential model, and are not limited to the specific embodiments described herein. However, stateless inference may be used in some examples of the present disclosure during deployment of the sequential DNN 104. For example, where the sequential DNN 104 is trained in a stateless mode (e.g., where the hidden states are reset at each sequence of images), the method of providing the input data (e.g., the image data 102) may require that data (e.g., feature maps) from a plurality of images are processed by the sequential DNN 104 to determine a temporal based prediction. Conventional systems have used a brute force approach where each feature map for each image in consideration is computed at each iteration across each layer of the DNN. However, these conventional DNNs require an increased amount of compute power and ultimately reduce the ability of the system to run in real-time, such as in autonomous machine applications.

The present system, in contrast to these conventional systems, may leverage previously computed feature maps to reduce the amount of compute for the system at each iteration during stateless inference. For example, a feature map for a first frame may be computed, and then a feature map for each successive frame may be computed. A number of these feature maps may be stored in a buffer and provided as input to the RNN with a feature map corresponding to a most recent frame. Once the feature maps are provided as input, the most recent feature map may be added to the buffer and the oldest, or least recent, feature map in the buffer may be removed from the buffer. This process may be repeated for each of the frames in the sequence to reduce the processing requirements of generating new feature maps for each frame at each iteration.

Figure 5A:
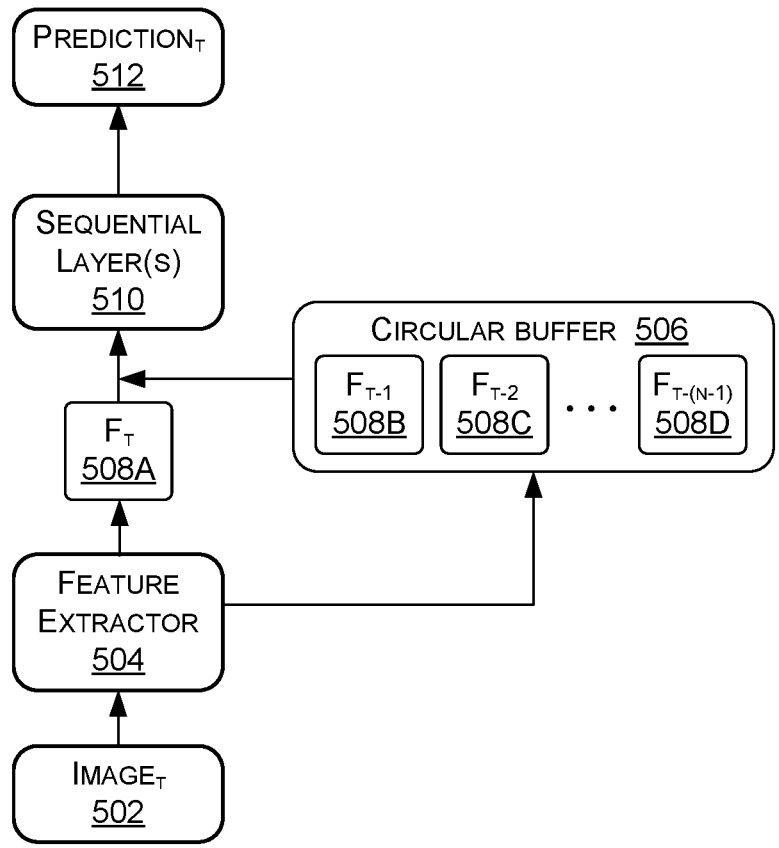
FIG. 5A is an example data flow diagram for stateless inference, in accordance with some embodiments of the present disclosure.

As an example, and with reference to FIG. 5A, an image 502 (e.g., an image represented by the image data 102 of FIG. 1) captured at time, T may be input to a feature extractor 504 to generate a feature map $F_T$ 508A for the image 502. The feature map $F_T$ corresponding to the image 502 may be fed into sequential layer(s) 510 (e.g., GRU, LSTM, and/or other sequential layer types) of a DNN, such as the sequential DNN 104 of FIG. 1. In addition to the feature map $F_T$ 508A from the image 502, feature maps $F_{T-1}$ to $F_{T-(N-1)}$ (508B-508D) may be fed into the sequential layer(s) 510 of the DNN. Each of the feature maps $F_{T-1}$ to $F_{T-(N-1)}$ (508B-508D) may correspond to a feature map 508 from an image captured at times previous to (or after, in some embodiments) the image 502 (e.g., the image 502 and each of the other images may correspond to a sequence of images). As such, the sequential layer(s) 510 may generate predictions using a number, N, of feature maps 508 from a number, N, of images, where the number, N, of images may be a hyper-parameter of the DNN (e.g., the sequential DNN 104 of FIG. 1).

As a non-limiting example, the number N, of feature maps 508 may be four, such that four feature maps 508 are input to the sequential layer(s) 510 at any one time to generate a prediction 512 for time, T. In such an example, a circular buffer 506 (and/or another memory or storage device type) may be used to store each of the three previous feature maps (e.g., $F_{T-1}$ to $F_{T-3}$) such that the feature maps do not need to be generated again at each iteration of the DNN. As a result—and in contrast to conventional brute force approaches—processing time is saved as prior feature map predictions from the feature extractor 504 are reused to generate the prediction 512 at time, T.

Figure 5B:
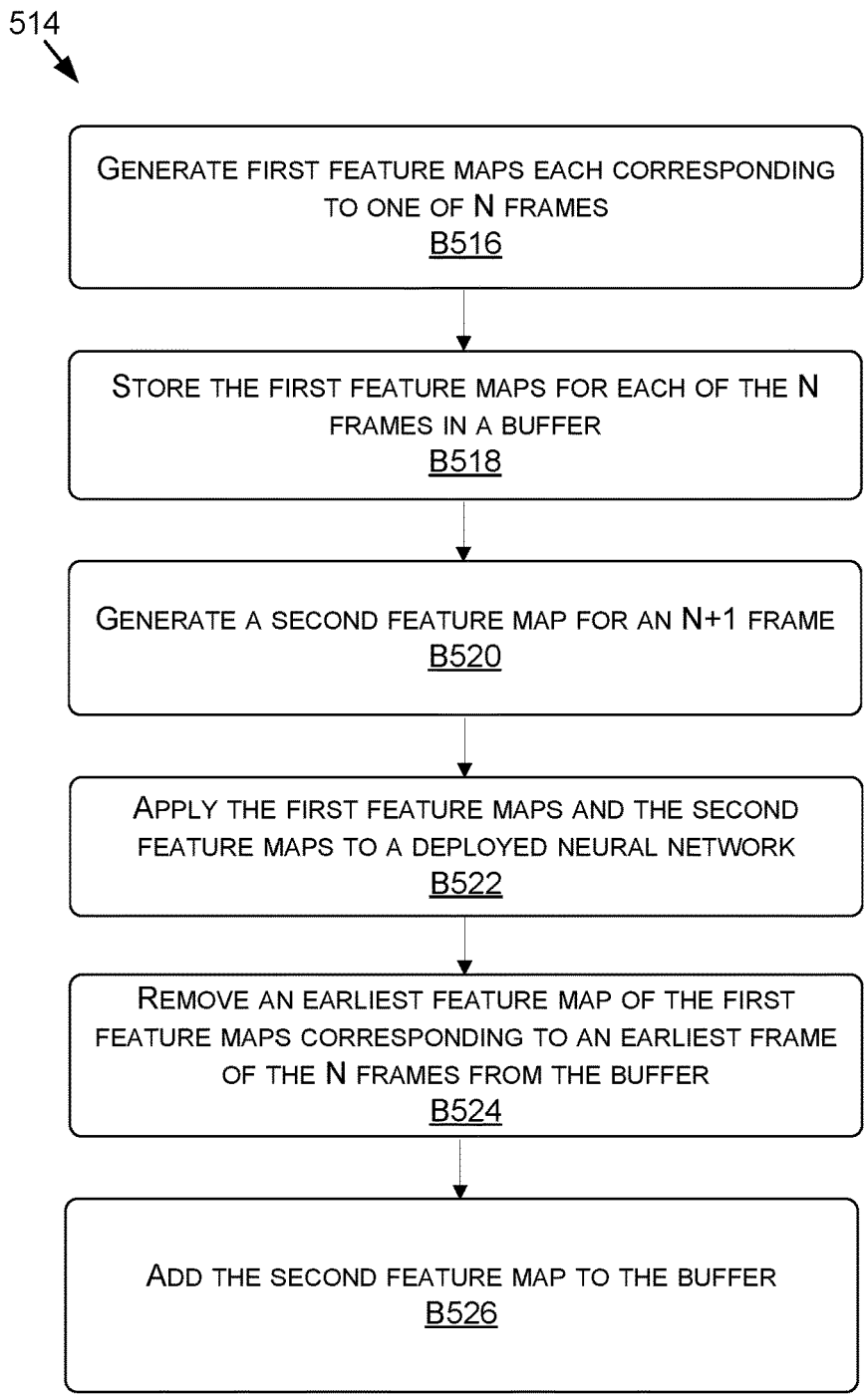
FIG. 5B is a flow diagram showing a method for stateless inference using a buffer, in accordance with some embodiments of the present disclosure.

Now referring to FIG. 5B, each block of method 514, described herein, comprises a computing process that may be performed using any combination of hardware, firmware, and/or software. For instance, various functions may be carried out by a processor executing instructions stored in memory. The method 514 may also be embodied as computer-usable instructions stored on computer storage media. The method 514 may be provided by a standalone application, a service or hosted service (standalone or in combination with another hosted service), or a plug-in to another product, to name a few. In addition, method 514 is described, by way of example, with respect to FIG. 5A. However, the method 514 may additionally or alternatively be executed by any one system, or any combination of systems, within any one process, or any combination of processes, including, but not limited to, those described herein.

FIG. 5B is a flow diagram showing a method 514 for stateless inference using a buffer, in accordance with some embodiments of the present disclosure. The method 514, at block B516, includes generating first feature maps each corresponding to one of N frames. For example, feature maps 508B-508D may be generated.

The method 514, at block B518, includes storing the first feature maps for each of the N frames in a buffer. For example, the feature maps 508B-508D may be stored in the buffer 506.

The method 514, at block B520, includes generating a second feature map for an N+1 frame. For example, the feature map 508A may be generated.

The method 514, at block B522, includes applying the first feature maps and the second feature maps to a deployed neural network. For example, the feature maps 508A-508D may be applied to the sequential DNN 104.

The method 514, at block B524, includes removing an earliest feature map of the first feature maps corresponding to an earliest frame of the N frames from the buffer. For example, the feature map 508D may be removed from the buffer 506 when the feature map 504A is added. As a result, the buffer may always store N frames worth of feature maps 508.

The method 514, at block B526, includes adding the second feature map to the buffer. For example, the feature map 508A may be added to the buffer 506.

Another process of the present system, in contrast to conventional systems, includes generating a feature map for each frame of a sequence of frames during stateless inference. The number of frames in the sequence of frames may be equal to the number of layers (or sets of layers) in the sequential DNN 104 used to compute the hidden states based on the feature maps. For each layer (or set of layers), a feature map of a corresponding frame in the sequence of frames may be applied, in addition to any feature maps from prior frames in the sequence of frames. For example, where four feature maps are used, a first layer (or set of layers) of the sequential DNN 104 may compute a hidden state for a first feature map corresponding to a latest frame, a second layer (or set of layers) of the sequential DNN 104 may compute a hidden state for the first feature map corresponding to the latest frame and a second feature map corresponding to a second latest frame, and so on, such that each layer (or set of layers) always computes a hidden state using (at least) one additional feature map from one additional frame than a prior layer (or set of layers) in the sequence. In addition, the hidden state from every layer (or set of layers) may be passed to the next layer (or set of layers) in the sequence of layers. Each of the layers (or sets of layers) may compute the hidden states in parallel, thereby reducing the run-time of the system in generating the predictions of the temporal information.

Figure 6A:
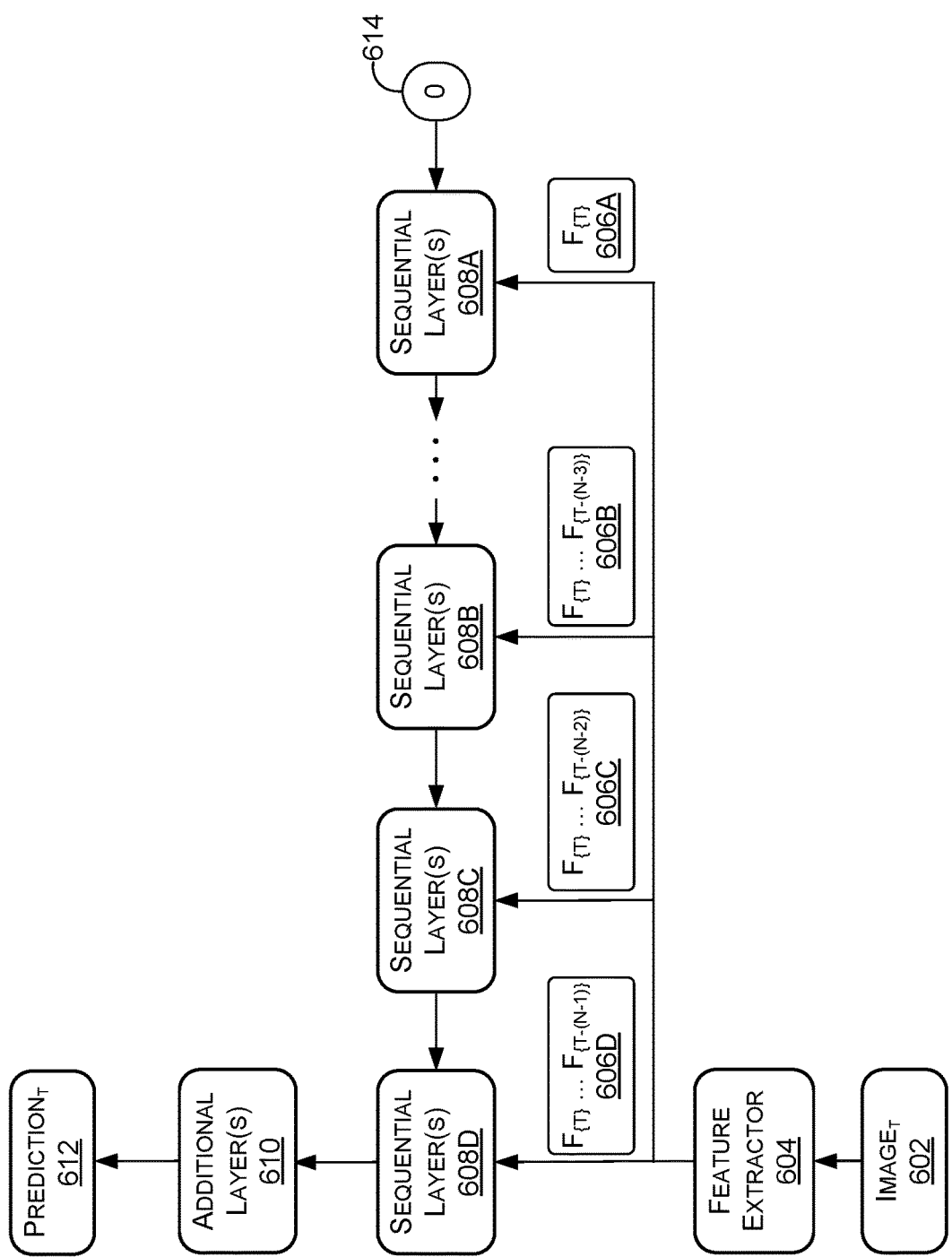
FIG. 6A is an example data flow diagram for stateless inference, in accordance with some embodiments of the present disclosure.

As an example, and with reference to FIG. 6A, a hidden state of a first set of sequential layers 608A (e.g., one or more layers may be included in the set of sequential layers 608) may be set to zero, as indicated at 614. An image 602 (e.g., an image represented by the image data 102 of FIG. 1) captured at time, T, may be input to a feature extractor 604 to generate a feature map $F_T$ 606A for the image 602. The feature map $F_T$ 606A corresponding to the image 602 may be fed into each set of sequential layers 608 (e.g., GRU, LSTM, and/or other sequential layer types) of a DNN, such as the sequential DNN 104 of FIG. 1. In addition to the feature map $F_T$ 606A from the image 502, feature maps $F_{T-1}$ to $F_{\{T-(N-1)\}}$ may be fed into each set of sequential layer(s) 608 of the DNN (e.g., sets of sequential layers 608-608D, in the non-limiting example of FIG. 6A). Each of the feature maps $F_T$ to $F_{\{T-(N-1)\}}$ 606A-606D may correspond to a feature map 606 from an image captured at times previous to (or after, in some embodiments) the image 602 (e.g., the image 602 and each of the other images may correspond to a sequence of images). As such, the sets of sequential layer(s) 608 may generate updated values of hidden states—in parallel, in some embodiments—using a number of feature maps 606 from a number of images in addition to using a hidden state from a previous set of sequential layers 608 in the sequence of sets of sequential layers 608. In some examples, the number of images may be a hyper-parameter of the DNN (e.g., the sequential DNN 104 of FIG. 1), such that the number of sets of sequential layers 608 corresponds to the number of images.

As a non-limiting example, the number of feature maps 606 may be four, such that four feature maps 606 are used as input to the sets of sequential layer(s) 608 (e.g., a first feature map $F_T$ 608A input to the set of sequential layers 608A, the first feature map $F_T$ 606A and a second feature map $F_{\{T-(N-3)\}}$ 606B input to the set of sequential layers 608B, the first feature map $F_{(T)}$ 606A the second feature map $F_{\{T-(N-3)\}}$ 606B, and a third feature map $F_{\{T-(N-2)\}}$ 606C input to the set of sequential layers 608C, and the first feature map $F_T$ 606A, the second feature map $F_{\{T-(N-3)\}}$ 606B, the third feature map $F_{\{T-(N-2)\}}$ 606C, and a fourth feature map $F_{\{T-(N-1)\}}$ 606D input to the set of sequential layers 608D). In addition, in such an example, a hidden state may be set to zero at the first set of sequential layers 608A, a computed hidden state of the first set of sequential layers 608A (e.g., using the first feature map, $F_T$, 606A) may be passed to the second set of sequential layers 608B, a computed hidden state of the second set of sequential layers 608B (e.g., using the first feature map $F_T$ 606A, the second feature map $F_{\{T-(N-3)\}}$ 606B, and the hidden state from the first set of sequential layers 608A) may be passed to the third set of sequential layers 608C, and so on. In some embodiments, the feature maps 606 may be input to the sets of sequential layers 608 such that the sets of sequential layers

608 may compute the hidden states in parallel (e.g., the first feature map $F_T$ 606A may be applied to each of the sets of sequential layers 608 at a first time, the second feature map $F_{\{T-(N-3)\}}$ 606B may be applied to each of the sets of sequential layers 608 after the first set of sequential layers 608A at a second time after the first time, and so on. The output of the last set of sequential layers 608 (e.g., the set of sequential layers 608D in the illustration of FIG. 6A) may be provided as input to additional layer(s) 610 of the DNN (e.g., convolutional layers, deconvolutional layers, etc.) to generate a prediction 612 for the image 602. As a result, and in contrast to conventional brute force approaches, processing time is saved as hidden states for sets of sequential layers 608 are computed in parallel.

The process described with respect to FIG. 6A may be written according to the below equations. For example, a hidden state variable for a sequential layer (e.g., of a set of sequential layers 608) may be denoted as $h_T^N$, which is the state computed at time, T, using N, images. Here, $h_T^{-1}$ is the initial state zero, which may be zero, in some embodiments, for all T. The hidden state that may be used in computing the output prediction (e.g., the prediction 612) at the time, T, may be $h_T^N$ when performing stateless inference with N images. $h_T^N$ may be a function of N+1 feature maps, $F_T$, over the N+1 input sequence of images, and may be expressed according to equation (1) below:

$$h_T^N = f(F_T, F_{T-1}, \ldots, F_{T-(N-1)}) \quad (1)$$

Thus, at every time instant, $h_T^N$ may be computed. In addition, because the layer(s) that compute the hidden states, h, may be recurrent (e.g., LSTM, GRU, etc.), a function, g may be used to denote the current hidden state as a function of a current input and a preceding hidden state, as in equation (2), below:

$$h_T^N = g(F_T, h_{T-1}^{N-1}) \quad (2)$$

As such, writing out all application of g (e.g., unrolling the recurrence in time), gives the below equations (3)-(6):

$$h_{T-(N-1)}^{-1} = 0 \quad (3)$$

$$h_{T-N}^0 = g(F_{T-N}, h_{T-(N-1)}^{-1}) \quad (4)$$

$$h_{T-1}^{N-1} = g(F_{T-1}, h_{T-2}^{N-2}) \quad (5)$$

$$h_T^N = g(F_T, h_{T-1}^{N-1}) \quad (6)$$

As such, the application of g may be illustrated, in a non-limiting example, as in equation (7), below:

$$h_T^N = g(F_T, g(F_{T-1}, g(F_{T-2}, \ldots, g(F_{T-N}, 0)))) \quad (7)$$

In addition, in order to compute the output for all time instance, N hidden states may be computed for N different length sequences of images in parallel at every time instant upon computing the input feature maps, $F_T$. As such, at each time instant, N states may be computed, according to, as a non-limiting example, equations (8)-(10), below:

$$h_T^0 = g(F_T, 0) \quad (8)$$

$$\ldots$$

$$h_T^{N-1} = g(F_T, h_{T-1}^{N-2}) \quad (9)$$

$$h_T^N = g(F_T, h_{T-1}^{N-1}) \quad (10)$$

which may be illustrated as the N+1 sets of sequential layers 608 in FIG. 6A.

In some embodiments, depending on the recurrent function g, some or all of the computation may be independent of the prior hidden state, thus allowing for further computation savings and increased run-time efficiency. For a non-limiting example, where GRU layers are used that include six convolutions, three forward convolution layers may be applied to the input alone (e.g., one for z-gate, one for r-gate, and one for a next hidden state). These values may be computed once, and the result may be reused N times.

Figure 6B:
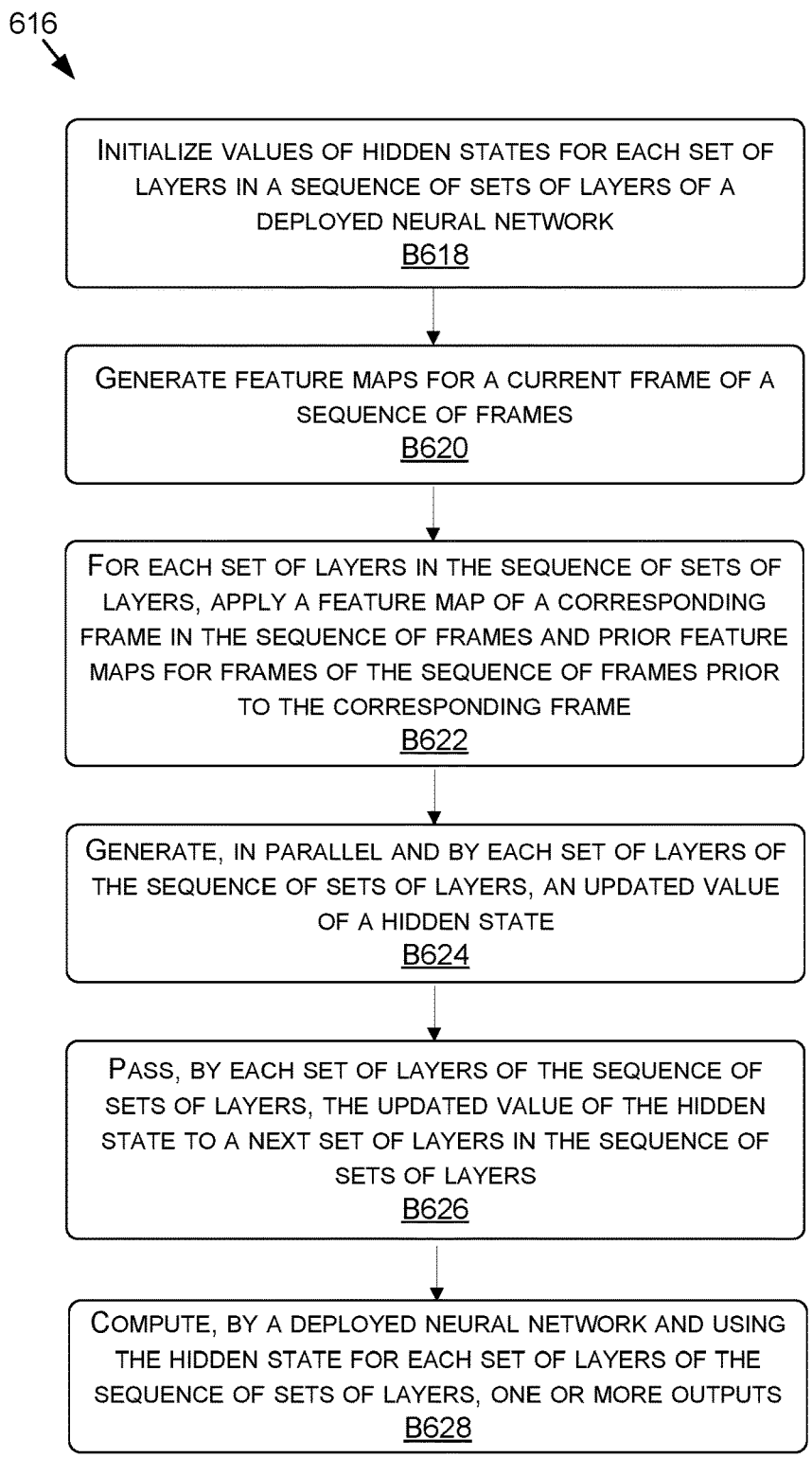
FIG. 6B is a flow diagram showing a method for stateless inference using parallel processing, in accordance with some embodiments of the present disclosure.

Now referring to FIG. 6B, each block of method 616, described herein, comprises a computing process that may be performed using any combination of hardware, firmware, and/or software. For instance, various functions may be carried out by a processor executing instructions stored in memory. The method 616 may also be embodied as computer-usable instructions stored on computer storage media. The method 616 may be provided by a standalone application, a service or hosted service (standalone or in combination with another hosted service), or a plug-in to another product, to name a few. In addition, method 616 is described, by way of example, with respect to FIG. 6A. However, the method 616 may additionally or alternatively be executed by any one system, or any combination of systems, within any one process, or any combination of processes, including, but not limited to, those described herein.

FIG. 6B is a flow diagram showing a method 616 for stateless inference using a parallel computing, in accordance with some embodiments of the present disclosure. The method 616, at block B618, includes initializing values of hidden states for each set of layers in a sequence of sets of layers of a deployed neural network. For example, the hidden states of the sequential layer(s) 608A-608D may be initialized to zero, to a random number, or to a state that has been obtained through an optimization procedure.

The method 616, at block B620, includes generating a feature map for a current frame of a sequence of frames. For example, a feature map 606 may be generated by the feature extractor 604 for a current frame.

The method 616, at block B622, includes, for each set of layers in the sequence of sets of layers, applying a feature map of a corresponding frame in the sequence of frames and prior feature maps for frames of the sequence of frames prior to the corresponding frame. For example, the sequential layer(s) 608A may have the feature map 606A applied to it, the sequential layer(s) 608B may have the feature maps 606B applied to it (that may include the feature maps 606A), and so on.

The method 616, at block B624, includes generating, in parallel and by each set of layers of the sequence of sets of layers, an updated value of a hidden state. For example, as the feature maps 606 are applied to the sequential layer(s) 608, the sequential layer(s) 608 may compute hidden values.

The method 616, at block B626, includes passing the updated value of the hidden state to a next set of layers in the sequence of layers by each set of layers of the sequence of sets of layers. For example, the value of the hidden state computed by the sequential layer(s) 608A may be passed to the sequential layer(s) 608B, the value of the hidden state computed by the sequential layer(s) 608B may be passed to the sequential layer(s) 608C, and so on.

The method 616, at block B628, includes computing, by a deployed neural network and using the hidden state for each set of layers of the sequence of sets of layers, one or more outputs. For example, a deployed neural network (e.g., the sequential DNN 104) may use the hidden states of each of the sequential layer(s) 608 to generate the prediction 612.

Training a Sequential Deep Neural Network for Temporal Predictions

During training, the sequential DNN may use ground truth data that is generated from a combination of training image data and training sensor data (e.g., using cross-sensor fusion). For example, the training image data may be used to generate bounding boxes corresponding to locations of objects in each image of the sequences of images. The training sensor data may be used to determine velocity information corresponding to each of the objects. The training sensor data may be representative of LIDAR data from one or more LIDAR sensors, RADAR data from one or more RADAR sensors, SONAR data from one or more SONAR sensors, and/or other training sensor data from one or more other sensor types.

In order to generate the ground truth data for 2D motion and 3D motion, the training sensor data may be correlated, or fused, with the training image data. For example, for LIDAR data, the LIDAR data points may be correlated to pixels in the image space using calibration information between the camera and the LIDAR sensor. For RADAR data, the RADAR data may detect objects in its field of view, and the objects may be correlated to objects detected in the images represented by the image data. Similar techniques may be used for other sensor types. In any example, the pixels corresponding to the detected objects in the images (e.g., as detected and identified using an object detection technique) may be augmented with information from the LIDAR data, the RADAR data, and/or other data. For example, one or more pixels corresponding to an object (or corresponding to a bounding shape of the object) may be associated with velocity data determined using the training sensor data. For LIDAR data, for example, depth information for an object may be determined over two or more images in a sequence, such that a change in depth values may be indicative of a velocity. For RADAR data, as another example, velocity data may be determined for objects in the field of view of the RADAR sensor. As such, because the object detection may be automatically generated (e.g., using a convolutional neural network, using an object detection computer vision algorithm, using an object tracking algorithm, etc.) with respect to the images, and the training sensor data may be automatically correlated to the training image data, the ground truth data used to train the sequential DNN may be automatically generated.

Figure 7:
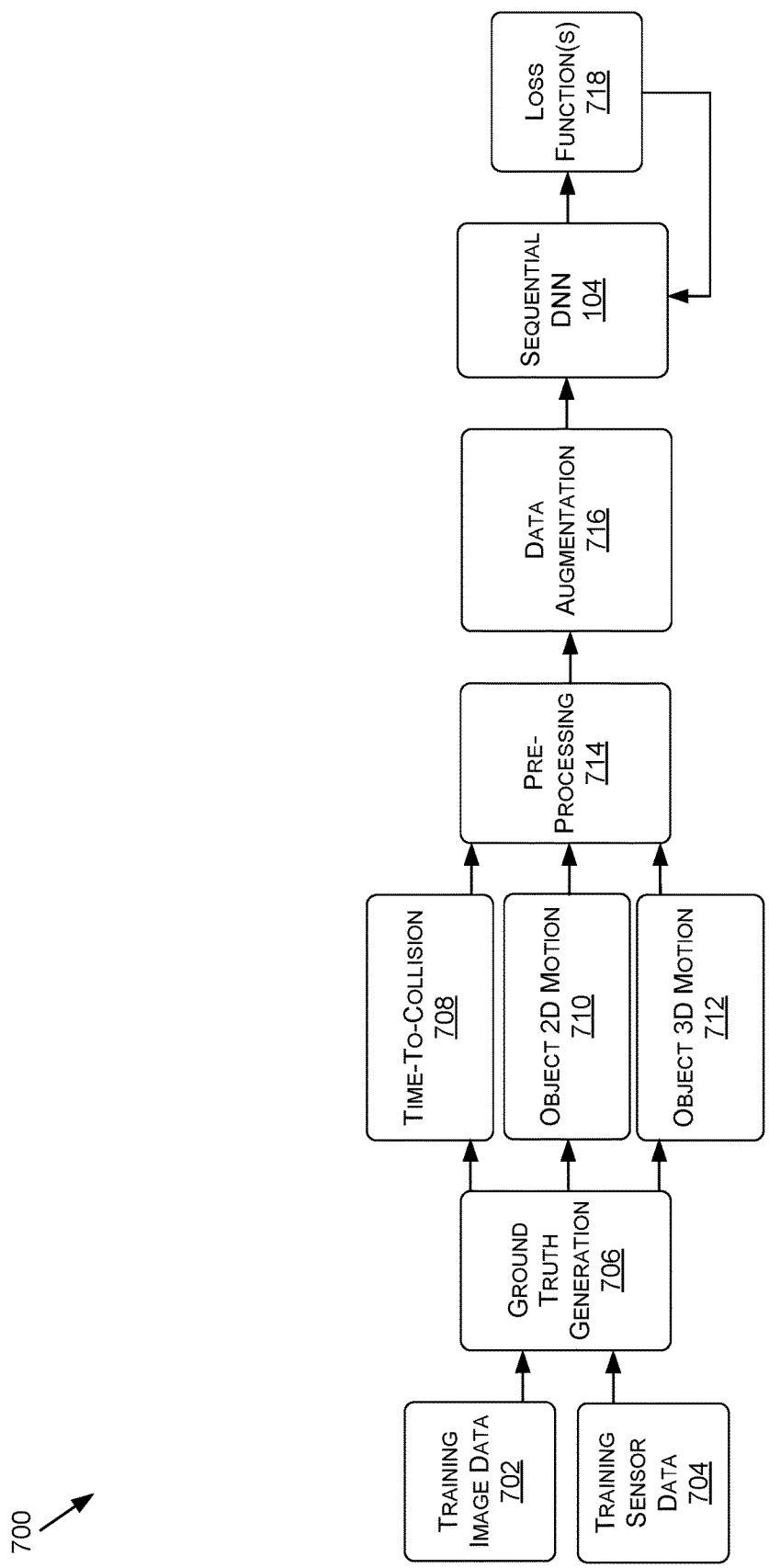
FIG. 7 is a data flow diagram illustrating an example process for training a sequential DNN to predict temporal information with respect to objects in an environment, in accordance with some embodiments of the present disclosure.

With reference to FIG. 7, FIG. 7 includes a data flow diagram for a process 700 of training a sequential deep neural network 104, in accordance with some embodiments of the present disclosure. Training image data 702 (which may be similar to the image data 102, but may correspond to the training data used for training the sequential DNN) and/or training sensor data 704 may be used to generate ground truth for training the sequential DNN 104. The training sensor data 704 may include LIDAR data from one or more LIDAR sensors 1464, RADAR data from one or more RADAR sensors 1460, SONAR data from one or more SONAR sensors (e.g., ultrasonic sensors 1462), and/or other training sensor data types from one or more other sensor types. The training image data 702 may represent sequences of images and the training sensor data 704 may include sensor data at least partially generated the same time as the training image data 702. As such, the training sensor data 704 (e.g., using timestamps) may be correlated with respective images of the sequence of images to generate the ground truth.

Ground truth generation 706, as described herein, may include automatic ground truth generation using a combination of the training image data 702 and the training sensor data—such as, without limitation, through cross-sensor fusion. As a result of the labels or annotations representing the ground truth being automatically generated, in some embodiments, manual labeling for generating of ground truth data may not be required. However, in some examples, manual labeling may be performed in addition to, or alternatively from, the automatic labeling. As such, in any example, the labels may be synthetically produced (e.g., generated from computer models or renderings), produced from real and/or raw data (e.g., designed and produced from real-world data), machine-automated (e.g., using feature analysis and learning to extract features from data and then generate labels), human annotated (e.g., labeler, or annotation expert, defines the location of the labels), and/or a combination thereof.

Where automatic ground truth generation is executed, the training sensor data 704 may be correlated, or fused, with the training image data 702. The vehicle 1400 may be equipped with different types of sensors as well as cameras (including, but not limited to, the sensors and cameras illustrated in FIGS. 14A-14C). For example, a number of RADAR sensors 1460, LIDAR sensors 1464, and/or other sensor types, in addition to a number of cameras, may be positioned on the vehicle 1400 such that there is overlap between fields of view of the cameras and fields of view—or sensory fields—of the sensors. The spatial layout of the sensors may be calibrated, in some embodiments, through self-calibration algorithms, and the synchronization of the sensors may be controlled to exhibit time alignment of sensor captures. This may aid in accurate propagation of the training sensor data 704 to the image space or camera domain for the automatic ground truth generation 706.

Figure 8:
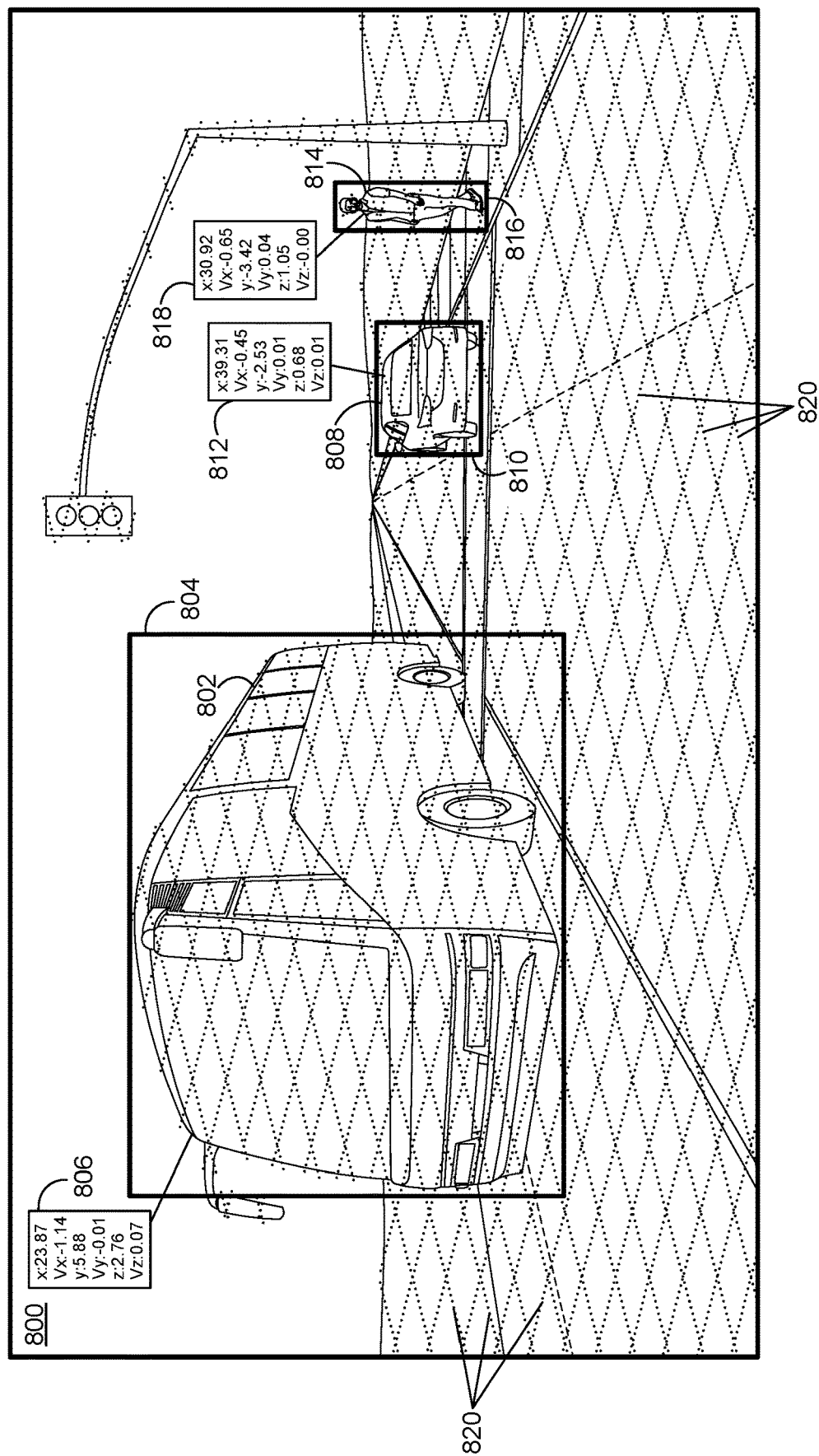
FIG. 8 is an example visualization of a cross-sensor fusions techniques for ground truth generation, in accordance with some embodiments of the present disclosure.

For example, and with respect to visualization 800 of FIG. 8, for LIDAR data, LIDAR data points 820 may be correlated to pixels in the image space using calibration information between the camera that generated the training image data 102 and the LIDAR sensor(s) 1464. For RADAR data, the RADAR data may represent velocities of objects (e.g., a van 802, a vehicle 808, and a pedestrian 814) in the field of view—or sensory field—of the RADAR sensor(s) 1460. The objects represented by the RADAR data may then be correlated to objects detected in the images represented by the training image data 702 (e.g., using an algorithm designed for vision and RADAR object fusion). Different techniques may be used for other sensor types to correlate the training sensor data 704 from the sensors with the training image data 702 in the image space. The pixels corresponding to the detected objects in the images (e.g., as detected and identified using an object detection technique, and represented by bounding shapes 804, 810, and 816 in FIG. 8) may be augmented with information from the LIDAR data, the RADAR data, and/or other training sensor data 704.

For example, one or more pixels corresponding to an object (or corresponding to a bounding shape of the object) may be associated with velocity data determined using the training sensor data 704. For LIDAR data, for example, depth information for an object may be determined over two or more images in a sequence, such that a change in depth values may be indicative of a velocity. For RADAR data, as another example, velocity data may be determined for objects in the field of view—or the sensor field—of the RADAR sensor 1460. As such, because the object detection with respect to the images may be automatically generated (e.g., using a convolutional neural network, using an object detection computer vision algorithm, using an object tracking algorithm, etc.), and the training sensor data 704 may be automatically correlated to the training image data 702, the ground truth used to train the sequential DNN 104 may be automatically generated. The training sensor data 704 may then be used to determine the locations of the objects in world space as well as the two-dimensional or three-dimensional velocity of each of the objects in world space. As illustrated in FIG. 8, location and velocity data 806 corresponding to the bus 802, location and velocity data 812 corresponding to the vehicle 808, and location and velocity data 818 corresponding to the pedestrian 814 may be determined using the training sensor data 704, and may be correlated to the object in the image space and leveraged for training the sequential DNN 104 to predict the locations and velocity information from image data alone in deployment. The location and velocity data 806 may represent an x, y, and z location (e.g., with respect to an origin point of the vehicle 1400) in world space for the bus 802. In addition, the location and velocity data 806 may represent the object 3D motion 712, which may correspond to, in world space, a velocity in an x direction, Vx, a velocity in a y direction, Vy, and/or a velocity in a z direction, Vz.

When generating the ground truth data, the van 802, the vehicle 808, and the pedestrian 814 may be identified using an object detection deep neural network (e.g., a convolutional DNN), an object detection computer vision algorithm, an object tracking algorithm, and/or another object detection method. For example, for each image in a sequence of images, the van 802, the vehicle 808, and the pedestrian 814 may be individually detected. In other examples, once the van 802, the vehicle 808, and/or the pedestrian 814 are detected in an image (e.g., using an object detection algorithm, a deep neural network, etc.), an object tracking algorithm may be used to track and identify the van 802, the vehicle 808, and/or the pedestrian 814 in the remaining images of the sequence of images where the van 802, the vehicle 808, and/or the pedestrian 814 are present. The bounding shapes 804, 810, and/or 816 may thus be generated for each object in each image where the objects are present. A conversion from pixels in image space to locations in world space may be known to the system, and thus—in some embodiments—a location in world space for each of the objects may be determined using the locations in image space. For each object, the object 2D motion 710 may be generated by leveraging the location and size of the bounding shapes related to the object across sequences of frames. For example, the scale change, Δs, may be determined by analyzing the difference in bounding shapes related to the object in different frames. The movement of the objects within the image space (e.g., the change in location of the bounding shapes across frames of a sequence of frames) may be used to generate the object 2D motion 710 ground truth data.

To determine time-to-collision (TTC) 708 for ground truth, the scale change Δs may be used in some non-limiting embodiments. For example, for an ideal camera, where the object angle is constant, equation (11) may be used:

$$TTC = \Delta t/\Delta s \quad (11)$$

where Δs is the scale change and Δt is the time between two consecutive frames that the scale change Δs is calculated for. As a result, the prediction of the sequential DNN 104 may depend on the sampling interval of the incoming images. In some examples, the sequential DNN 104 may be trained to implicitly assume a time (e.g., Δt) baseline, such that the value output by the sequential DNN 104 may be used directly in determining the TTC (e.g., as described herein, the sequential DNN 104 may be trained to output 1/TTC, so the value of 1/TTC may be used directly in calculating the TTC). In practice, where an ideal camera and/or a constant object angle may not be possible, differences between the actual camera used and/or the constant object angle may not have a significant impact, so equation (11) may be still used. However, in some embodiments, equation (12), below, may be a more accurate representation of TTC:

$$TTC \approx \Delta t/\Delta s \quad (12)$$

However, using TTC directly as ground truth for training the sequential DNN 104 may result in unbounded values (e.g., [−∞, −a]∪[b, ∞]). As a result, when the vehicle 1400 (e.g., the ego-vehicle) and another object are stationary with respect to one another, the value of TTC may go to infinity. As such, the TTC 708 used for ground truth when training the sequential DNN 104 may be the inverse TTC (e.g., 1/TTC). 1/TTC produces nicely bounded values (e.g., [−1/a, 1/b]) which may allow for use of gradient descent based methods for optimization, for example. As such, equation (13), below, may be used to generate the ground truth for training the network, and then post-processing may be used to convert 1/TTC to TTC:

$$\frac{1}{TTC} \approx \Delta s/\Delta t \quad (13)$$

In some examples, pre-processing 714 may be used on the data to ensure that the data used for ground truth is accurate. In some embodiments, the pre-processing 714 on the training image data 702 and/or the training sensor data 704 may include the pre-processing described herein with respect to the image data 102. In addition, the pre-processing 714 may include cleaning, or removing noise from, the training sensor data 704 and/or the training image data 702. For example, one or more filters may be used to filter out ground truth data that may not be inaccurate, or may be inconsistent. For example, unless there are consistent tracking results across images of a sequence of images for a same object (e.g., for the bus 802, in FIG. 8), those tracking results may not be used. In such an example, the images where there are not at least two or more consecutive detections of an object may be disregarded with respect to tracking of that object in those images. As a result, these false or inaccurate detections may be removed from the ground truth in an effort to reduce noise in predictions of the sequential DNN 104.

As another example, vision (e.g., image) and RADAR associations and/or vision and LIDAR associations (and/or vision and other sensor type associations) that are not consistent in sequential images may be removed from use during ground truth generation. In such an example, the training sensor data 704 corresponding to the objects for which there are inconsistencies may be ignored when generating the ground truth, such that only consistent associations between the images and LIDAR data (e.g., LIDAR point projections into image space) and/or the images and RADAR data are used for ground truth generation with respect to any one object. As such, if the values associated with an object in image space determined from LIDAR data are not within a threshold similarity to the values associated with the object in image space determined from RADAR data, at least one of the LIDAR data or the RADAR data may be ignored.

In some examples, cross-sensor consistency may be required for inclusion in the ground truth data set. For example, for ground truth data from both RADAR sensors 1460 and LIDAR sensors 1464 (and/or other sensor types), the ground truth may be required to be consistent across multiple sensors before the ground truth data is used. This may include consistency across data from two or more of the same sensor type and/or consistency across data from two or more different sensor types with a similar object in their fields of view—or sensory fields.

Data augmentation 716 may be used on the training image data 702 and/or the training sensor data 704 to increase the size of the training set and/or to reduce the likelihood of overfitting for the sequential DNN 104 predictions. For example, the images represented in the training image data 702 may be cropped, rotated, down-sampled, up-sampled, skewed, shifted, and/or otherwise augmented for training the sequential DNN 104. In addition, the ground truth data associated with the images may be similarly augmented such that the ground truth labels and annotations are accurate with respect to the augmented images. In some examples, temporal augmentation may be used to train the sequential DNN 104 on intervals of images from within a sequence different than an image by image interval (e.g., every other image, every fourth image, etc.), and/or may be trained on sequences of images in reverse order, as described in more detail herein at least with respect to FIGS. 10 and 11.

Figure 9:
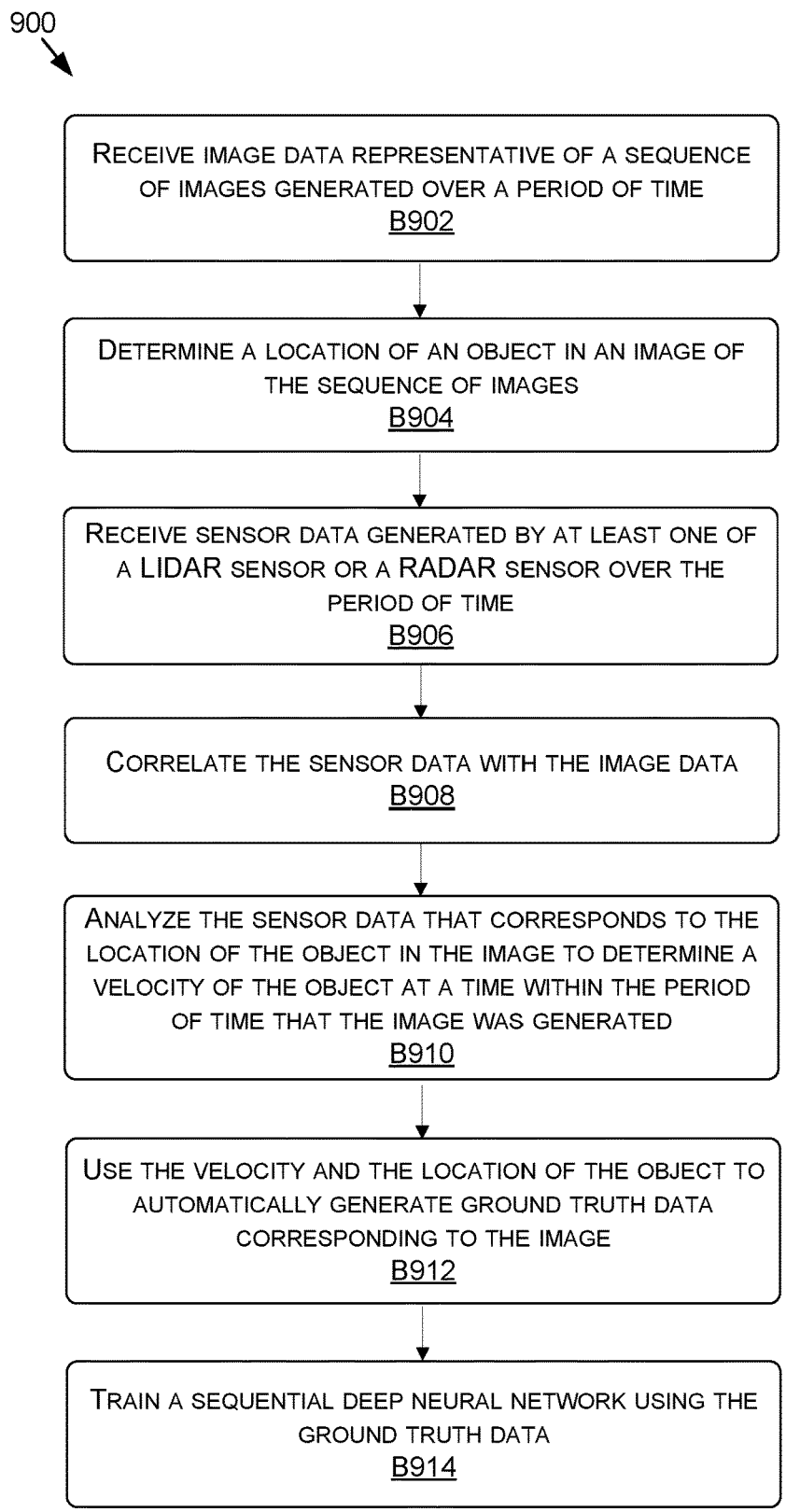
FIG. 9 is a flow diagram showing a method for automatic ground truth generation using cross-sensor fusion, in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method 900 may also be embodied as computer-usable instructions stored on computer storage media. The method 900 may be provided by a standalone application, a service or hosted service (standalone or in combination with another hosted service), or a plug-in to another product, to name a few. In addition, method 900 is described, by way of example, with respect to FIG. 7. However, the method 900 may additionally or alternatively be executed by any one system, or any combination of systems, within any one process, or any combination of processes, including, but not limited to, those described herein.

FIG. 9 is a flow diagram showing a method 900 for automatic ground truth generation using cross-sensor fusion, in accordance with some embodiments of the present disclosure. The method 900, at block B902, includes receiving image data representative of a sequence of images generated over a period of time. For example, the training image data 702 may be received, where the training image data 702 is generated over a period of time.

The method 900, at block B904, includes determining a location of an object in an image of the sequence of images. For example, the location of an object in an image(s) of the sequence of images may be determined using an object detection algorithm, an object tracking algorithm, and/or an object detection neural network.

The method 900, at block B906, includes receiving sensor data generated by at least one of a LIDAR sensor or a RADAR sensor over the period of time. For example, the training sensor data 704 may be received over the period of time.

The method 900, at block B908, includes correlating the sensor data with the image data. For example, using one or more techniques (including, without limitation, cross-sensor fusion), the training sensor data 704 may be correlated with the training image data 702.

The method 900, at block B910, includes analyzing the sensor data that corresponds to the location of the object in the image to determine a velocity of the object at a time within the period of time that the image was generated. For example, the training sensor data 704 that corresponds to the object may be used to determine a location of the object.

The method 900, at block B912, includes using the velocity and the location of the object to automatically generate ground truth data corresponding to the image. For example, the velocity and the location of the object may be used to automatically generate the ground truth data that corresponds to the image by, for example, associating the velocity with one or more pixels corresponding to the object in the image.

The method 900, at block B914, includes training a sequential deep neural network (DNN) using the ground truth data. For example, the sequential DNN 104 may be trained using the ground truth data.

Temporal Augmentation for Training a Sequential Deep Neural Network

The temporal augmentation described herein may be a process that is applicable to any ground truth generation and/or training for any sequential DNN within respect to any domain, in addition to motion prediction for autonomous vehicle perception systems. With respect to the present disclosure, however, temporal augmentation may be used at least for the scale change, Δs, velocity prediction, bounding shape locations, and/or the TTC prediction.

In some embodiments, temporal augmentation of training data may be used for training the sequential DNN 104. For example, a sequence of images may be used, in order (e.g., every frame in consecutive order), as inputs to the sequential DNN 104 during training. However, because the calculation of ground truth may be based on temporal information (e.g., frame rate), the sequence of images may be used in different frame intervals (e.g., every frame, every other frame, every third frame, etc.) as inputs to the sequential DNN 104. In addition, the images may be input in forward order, or may be input in reverse order. As such, frame interval changes, order changes, or a combination thereof may be used to augment the training images such that the training data size and the robustness of the system is increased. For example, because the frame interval may be changed, the sequential DNN 104 may be trained to interpret different translations of objects across frames (e.g., when using frames in sequence, the object may move slightly, and when using every other frame, or every third frame, the object may move more drastically). In such an example, the training examples may be generated from the ground truth data that correspond to dangerous traffic conditions that may be unsafe to recreate in the real world.

Figure 10:
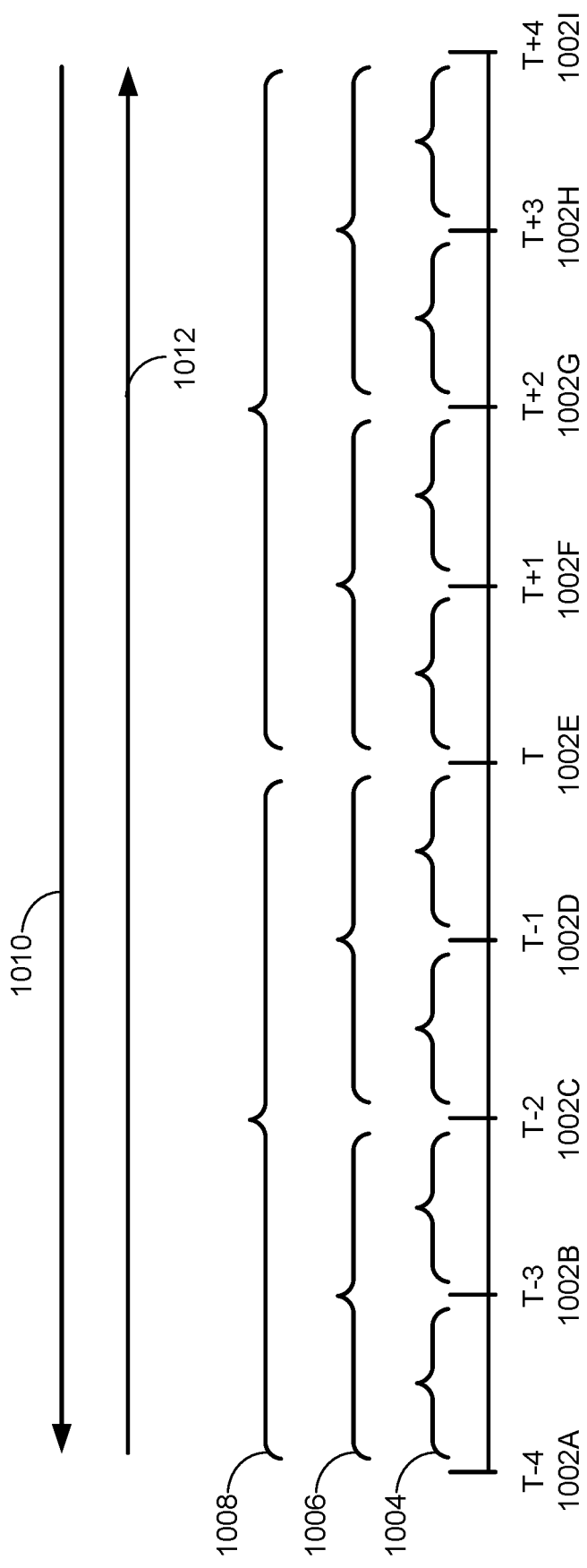
FIG. 10 is an example illustration of temporal augmentation, in accordance with some embodiments of the present disclosure.

As such, and with reference to FIG. 10, temporal augmentation may be used for every K image in a sequence of images, where K may be any positive (e.g., forward in time along line 1012) or negative number (e.g., backward in time along line 1010). For example, the scale change ground truth data may be generated for every frame 1002, every two frames 1002, every four frames 1002, etc., in a forward or backward sequence. For example, each of the frames 1002 (e.g., 1002A-1002I) may be from a sequence of frames captured at times T−4 to T+4. Brackets 1004 may indicate where K is equal to 1, brackets 1006 may indicate where K is equal to 2, and brackets 1008 may indicate where K is equal to 4. Although only augmentation with K of 1, 2, and 4 is illustrated in FIG. 10, this is not intended to be limiting. Any number may be used for K to augment the training data temporally. By adjusting the value of K, the training data set may be increased in size and the robustness of the system may be increased.

In conventional sequential model training, temporal batches may be used by forming sequences of N consecutive frames that satisfy the below relationship (14):

$$\{\text{Image}_{T-i}\}, i \in \{0,1,\ldots,N-1\} \quad (14)$$

However, in the temporal augmentation techniques of the present disclosure, instead of using a fixed time step increment of 1, as in conventional systems, batching may instead be represented by the below relationship (15):

$$\{\text{Image}_{T-Ki}\}, i \in \{0,1,\ldots,N-1\}, K \in \mathbb{Z} \quad (15)$$

Where K may be, in some embodiments, sampled at random from a discrete probability distribution over integers. For example, K may be uniformly distributed over $\{-4, -2, -1, 1, 2, 4\}$, as illustrated in FIG. 10.

Depending on what is to be predicted by the sequential DNN 104 (or any other sequential model in different applications), some of the ground truth values may need to be augmented in accordance with the change in K, while other ground truth values may not be similarly augmented. As an example, and with respect to present application, the bounding shape at time, T, may not need adjustment, the object distance at time, T, may not need adjustment, and the object orientation at time, T, may not need adjustment. However, some dynamic or temporal attributed may need adjustment, such as TTC, $\Delta s$, velocity, and/or bounding shapes after X steps, as represented in (16)-(19), below:

$$\text{TTC} \leftarrow \text{TTC}/K \quad (16)$$

$$\Delta s \leftarrow \Delta s * K \quad (17)$$

$$\text{Velocity} \leftarrow \text{Velocity} * K \quad (18)$$

$$\text{Bounding shape after } X \text{ steps} \leftarrow \text{Bounding shape after } X*K \text{ steps} \quad (19)$$

Figure 11:
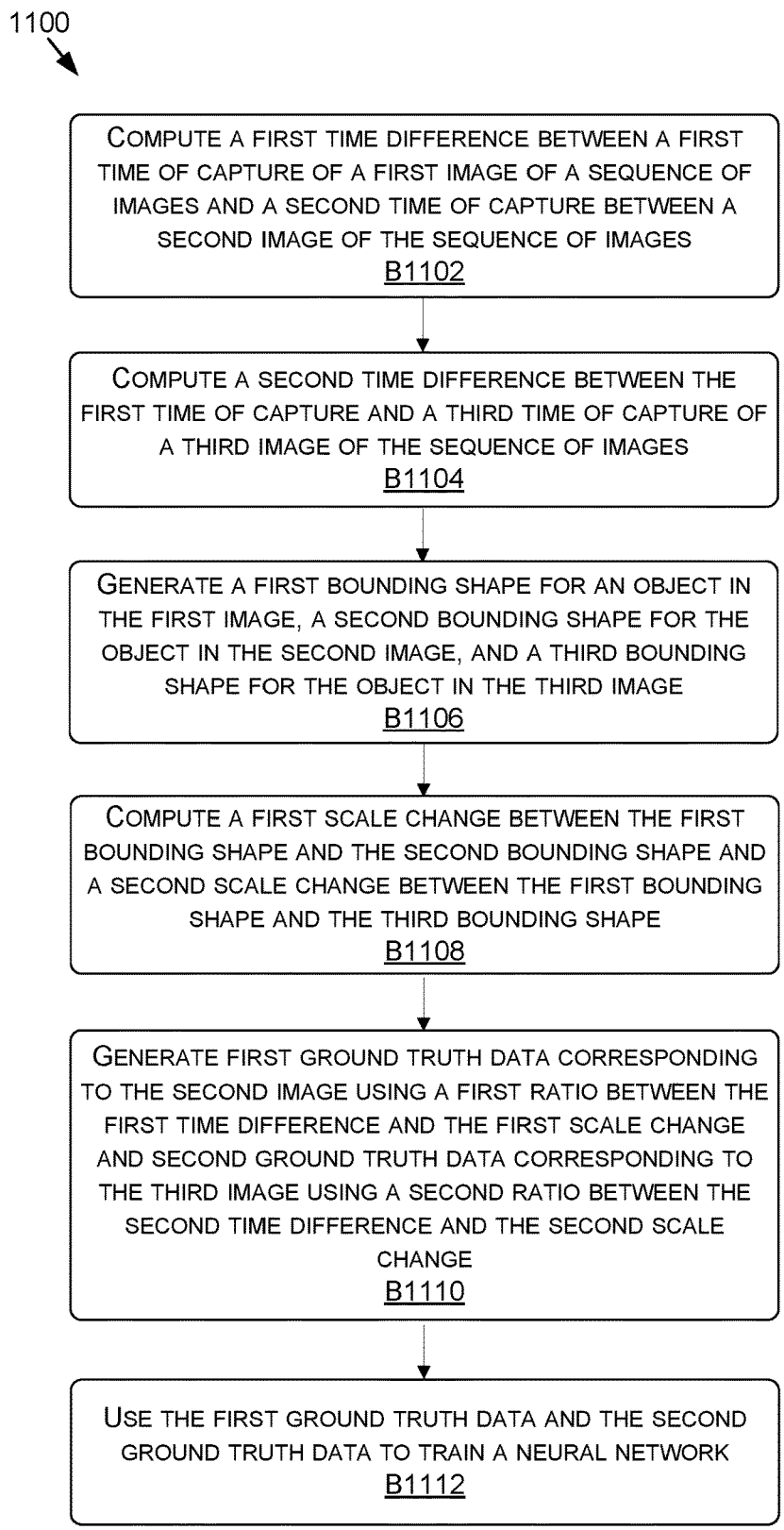
FIG. 11 is a flow diagram showing a method for temporal augmentation, in accordance with some embodiments of the present disclosure.

Now referring to FIG. 11, each block of method 1100, described herein, comprises a computing process that may be performed using any combination of hardware, firmware, and/or software. For instance, various functions may be carried out by a processor executing instructions stored in memory. The method 1100 may also be embodied as computer-usable instructions stored on computer storage media. The method 1100 may be provided by a standalone application, a service or hosted service (standalone or in combination with another hosted service), or a plug-in to another product, to name a few. In addition, method 1100 is described, by way of example, with respect to FIG. 10. However, the method 1100 may additionally or alternatively be executed by any one system, or any combination of systems, within any one process, or any combination of processes, including, but not limited to, those described herein.

FIG. 11 is a flow diagram showing a method 1100 for temporal augmentation, in accordance with some embodiments of the present disclosure. The method 1100, at block B1102, includes computing a first time difference between a first time of capture of a first image of a sequence of images and a second time of capture between a second image of the sequence of images. For example, a first time difference between a first time of capture of the first frame 1002E and the second frame 1002F of the sequence of frames may be determined.

The method 1100, at block B1104, includes computing a second time difference between the first time of capture and a third time of a capture of a third image of the sequence of images. For example, a second time difference between the first time of capture of the first frame 1002E and the third frame 1002G may be determined.

The method 1100, at block B1106, includes generating a first bounding shape for an object in the first image, a second bounding shape for the object in the second image, and a third bounding shape for the object in the third image. For example, a bounding shape (e.g., the bounding shape 804 of FIG. 8) may be generated for the object in each of the three frames 1002E-1002G.

The method 1100, at block B1108, includes computing a first scale change between the first bounding shape and the second bounding shape and a second scale change between the first bounding shape and the third bounding shape. For example, the scale change, s, between the first bounding shape and the second bounding shape and the first bounding shape and the second bounding shape may be computed.

The method 1100, at block B1110, includes generating first ground truth data corresponding to the second image using a first ratio between the first time difference and the first scale change and second ground truth data corresponding to the third image using a second ratio between the second time difference and the second scale change. For example, the ratio of $\Delta t/\Delta s$ may be used to generate the ground truth data for the second frame 1002F and the third frame 1002G. As a result, the first frame 1002E may be used in generating ground truth at different strides (e.g., every frame, every other frame, every fourth frame, etc.) in order to increase the robustness of the training data set and train the sequential DNN 104 (or any DNN) for situations that otherwise may be difficult to generate training data for (e.g., dangerous situations).

The method 1100, at block B1112, includes using the first ground truth data and the second ground truth data to train a neural network. For example, the first ground truth data and the second ground truth data may be used to train a neural network (e.g., the sequential DNN 104) to predict various temporal information using a more robust training data set.

Stateful Training for a Sequential Deep Neural Network

The stateful training applications described herein may be used in any training method for any sequential model, and are not limited to the specific embodiments described herein. Stateful training and inference may perform more effectively with densely labeled data, as opposed to stateless training (described herein) which may perform more effectively with sparsely labeled data. For example, the densely labeled data may allow for leverage of consecutively computed predictions for multiple gradient computation.

During inference (e.g., during deployment), a sequential model may be run in a fully stateful mode where the hidden states may only be reset at start-up. As a result, a single forward pass computation may be required per time instance, as represented by equation (20), below:

$$\{y_t, h_t\} = \text{DNN}\{x_t, h_{t-1}\}$$

where y is a prediction, x is the input (e.g., an image), h denotes a hidden state, t is a time index, and DNN represents a single feedforward neural network with two inputs and two outputs. Although the DNN may contain multiple hidden states, the hidden states may be jointly represented in equation (20) by a single state variable, h.

In some embodiments of the present disclosure, stateful training may be used for the sequential DNN 104 to account for, and remedy, this contrast between training and inference. For example, a balance between fully uncorrelated mini-batches and fully continuous training data input may be achieved by randomizing the effective sequence length during training. For example, the sequential DNN may be trained to maintain, or store, a hidden state across sequences of frames without resetting the hidden state. For example, each mini-batch may include a grid of frames or images, where each row of the mini-batch includes a feature vector. In order to prevent the sequential DNN 104 from overfitting, the sequences of images across mini-batches may vary. For example, from a first mini-batch to a second mini-batch, the sequence of images may continue (e.g., frames 1, 2, 3 in first mini-batch, and then frames 4, 5, 6 in the second mini-batch). As another example, from a first mini-batch (e.g., at a different row) to a second mini-batch (at the different row), the sequence of images may not continue (e.g., frames 3, 5, 7 in the first mini-batch, and then frames 3, 2, 1 in the second mini-batch).

By staggering the order, frame interval, and sequences across mini-batches, the sequential DNN 104 may be trained to predict outputs without overfitting to a training data set. For example, the recurrent layers of the sequential DNN 104 may not be able to adapt and overfit to a specific fixed number of context frames and the amount of correlation between optimizer iterations may be tuned such that fast convergence is retained. In addition, the training data may be made to contain examples with a large amount of context which may lend itself well to accurate predictions during inference in a fully recurrent or stateful mode. Another benefit of the stateful training methods described herein is the efficient use of compute and memory resources. For example, each mini-batch may not only be used for updating weights and biases with back propagation through time over the time extent of a single mini-batch, but each mini-batch may also be used to set the network hidden state into a fully realistic hidden state for use in the next mini-batch and optimizer iteration.

Figure 12:
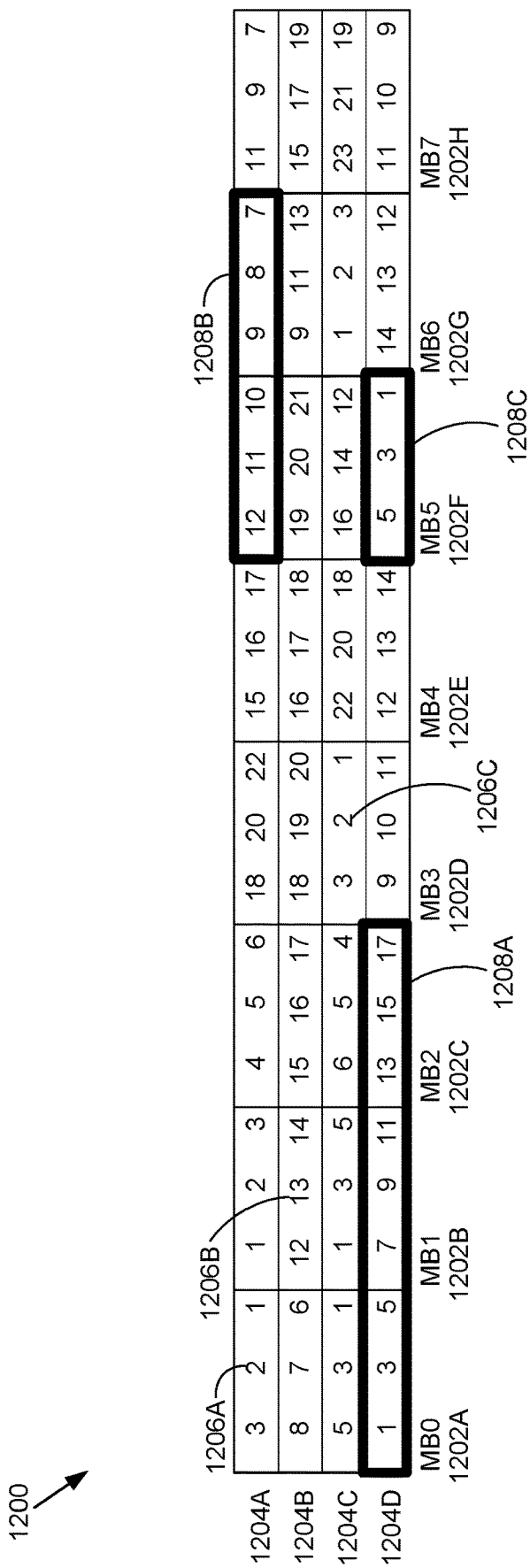
FIG. 12 is an example illustration of a training data set used for stateful training, in accordance with some embodiments of the present disclosure.

FIG. 12 includes an example of randomizing an effective length, stride, and/or direction of mini-batches in a training data set. For example, a training data set 1200 may include a number of mini-batches MB0 (1202A)-MB7 (1202H), where each mini-batch 1202 may include a mini-batch size (e.g., four, in the example of FIG. 12) corresponding to a number of examples 1204 (e.g., examples 1204A-1204D, in FIG. 12). In addition, each example 1204 within each mini-batch 1202 may include a sequence length of frames (e.g., where each frame is indicated by a frame index 1206, such as 1206A-1206C). A sequence of frames and associated ground truth labels and other metadata in an example 1204 of a single mini-batch 1202 may be referred to herein as a feature vector. The frames in the sequences of frames may be at different strides (e.g., stride randomization), such that an example 1204A at mini-batch 1202A may be at a stride of −1 (e.g., 3, 2, 1), and an examples 1204D at mini-batch 1202A may be at a stride of +2 (e.g., 1, 3, 5). In addition, although each example 1204 in each mini-batch 1202 may only include a set sequence length (e.g., three in FIG. 12), sequences of mini-batches 1202 within an example may have a longer sequence length (e.g., a master sequence length). As such, the master sequence length may also be randomized (e.g., master sequence randomization) such that—as a non-limiting example and with respect to FIG. 12—the master sequence length may be three, six, nine, and/or some other factor of three. For example, across mini-batches 1202A-1202C in example 1204D, a master sequence length 1208A may be nine, across mini-batches 1202F-1202G in example 1204A, a master sequence length 1208B may be six, and for mini-batch 1202F in example 1204D, a master sequence length 1208C may be three. To determine the frame indices that are to be input into the mini-batches to generate the training data set 1200, a randomization and/or probability algorithm may be used.

The training data set 1200 may be input to the sequential DNN 104 (when the sequential DNN 104 is trained for a stateful mode) during training. During this training, and as a non-limiting example, the hidden state for mini-batch 1202F at example 1204A may be stored after the sequential DNN 104 processes frames 12, 11, and 10. Then, when the next mini-batch 1202G at example 1204A is received, the hidden state that is stored may be used when computing the updated hidden state for the frames 9, 8, and 7. As such, when an example 1204 includes contiguous frames across mini-batches, the hidden states may be stored (e.g., not reset to a random value or a zero value). As another non-limiting example, the hidden state for mini-batch 1202F at example 1204D may be computed after the sequential DNN 104 processes frames 5, 3, and 1. Then, when the next mini-batch 1202G at example 1204A is received, the hidden state that is from the prior mini-batch 1202F at example 1204D may be reset to a random value or a zero value when computing the hidden state for the frames 14, 13, and 12. Thus, when an example 1204 does not include contiguous frames across mini-batches, the hidden states may be reset. In some examples, although the hidden states may be reset after example 1204D of mini-batch 1202F, the hidden state may be stored anyway. This may be beneficial if example 1204D at mini-batch 1202E had been contiguous with the sequence of example 1204D at mini-batch 1202F. By staggering and randomizing the master sequence lengths, strides, and/or direction of the frames across examples 1204 and mini-batches 1202, the balance between fully uncorrelated mini-batches and fully continuous training data sets may be achieved—thereby resulting the sequential DNN 104 being more accurate in deployment while also allowing for stochastic gradient descent based optimization methods to be employed.

Now referring to FIG. 13, each block of method 1300, described herein, comprises a computing process that may be performed using any combination of hardware, firmware, and/or software. For instance, various functions may be carried out by a processor executing instructions stored in memory. The method 1300 may also be embodied as computer-usable instructions stored on computer storage media. The method 1300 may be provided by a standalone application, a service or hosted service (standalone or in combination with another hosted service), or a plug-in to another product, to name a few. In addition, method 1300 is described, by way of example, with respect to FIG. 12. However, the method 1300 may additionally or alternatively be executed by any one system, or any combination of systems, within any one process, or any combination of processes, including, but not limited to, those described herein.

FIG. 13 is a flow diagram showing a method 1300 for stateful training, in accordance with some embodiments of the present disclosure. The method 1300, at block B1302, includes selecting a first sequence of images for a first feature vector of a first mini-batch and a second sequence of images for a second feature vector of a second mini-batch immediately subsequent the first mini-batch, first images in the first sequence of images and the second sequence of images being ordered consecutively at a first stride. For example, using a randomization or probability algorithm, a first sequence of images (e.g., the frames at example 1204A of mini-batch 1202F) and a second sequence of images (e.g., the frames at examples 1204A of mini-batch 1202G) may be selected, where the frames are ordered consecutively (e.g., 12, 11, 10, 9, 8, 7) at a stride of one in reverse order.

The method 1300, at block B1304, includes selecting a third sequence of images for a third feature vector of the first mini-batch and a fourth sequence of images for a fourth feature vector of the second mini-batch, second images in the third sequence of images and the fourth sequence of images being ordered non-consecutively. For example, using the randomization or probability algorithm, a third sequence of images (e.g., the frames at example 1204C of mini-batch 1202A) and a fourth sequence of images (e.g., the frames at example 1204C of mini-batch 1202B) may be selected, where the frames are ordered non-consecutively (e.g., 5, 3, 1, 1, 3, 5).

The method 1300, at block B1306, includes applying the first mini-batch and the second mini-batch to a neural network during training. For example, the first mini-batch (e.g., mini-batch 1202A) and the second mini-batch (e.g., mini-batch 1202B) may be applied to neural network (e.g., the sequential DNN 104) during training. As a result, the master sequence lengths, stride, and/or direction of the sequences of images may be randomized to aid in the prevention of overfitting to the data set during training.

The methods for stateful training described herein may be equally applicable to any training of any sequential model, and thus may find application in other domains or technology areas other than motion prediction for autonomous vehicle perception systems. For example, these methods may be readily applicable when the training data contains labels for all frame indices, because the frame indices may be utilized for loss and gradient computation. These methods are also applicable where every N-th frame is labeled in a regular pattern. For example, the data may be iterated such that the labeled frame occurs always as the last frame of each mini-batch.

Example Autonomous Vehicle

Figure 14A:
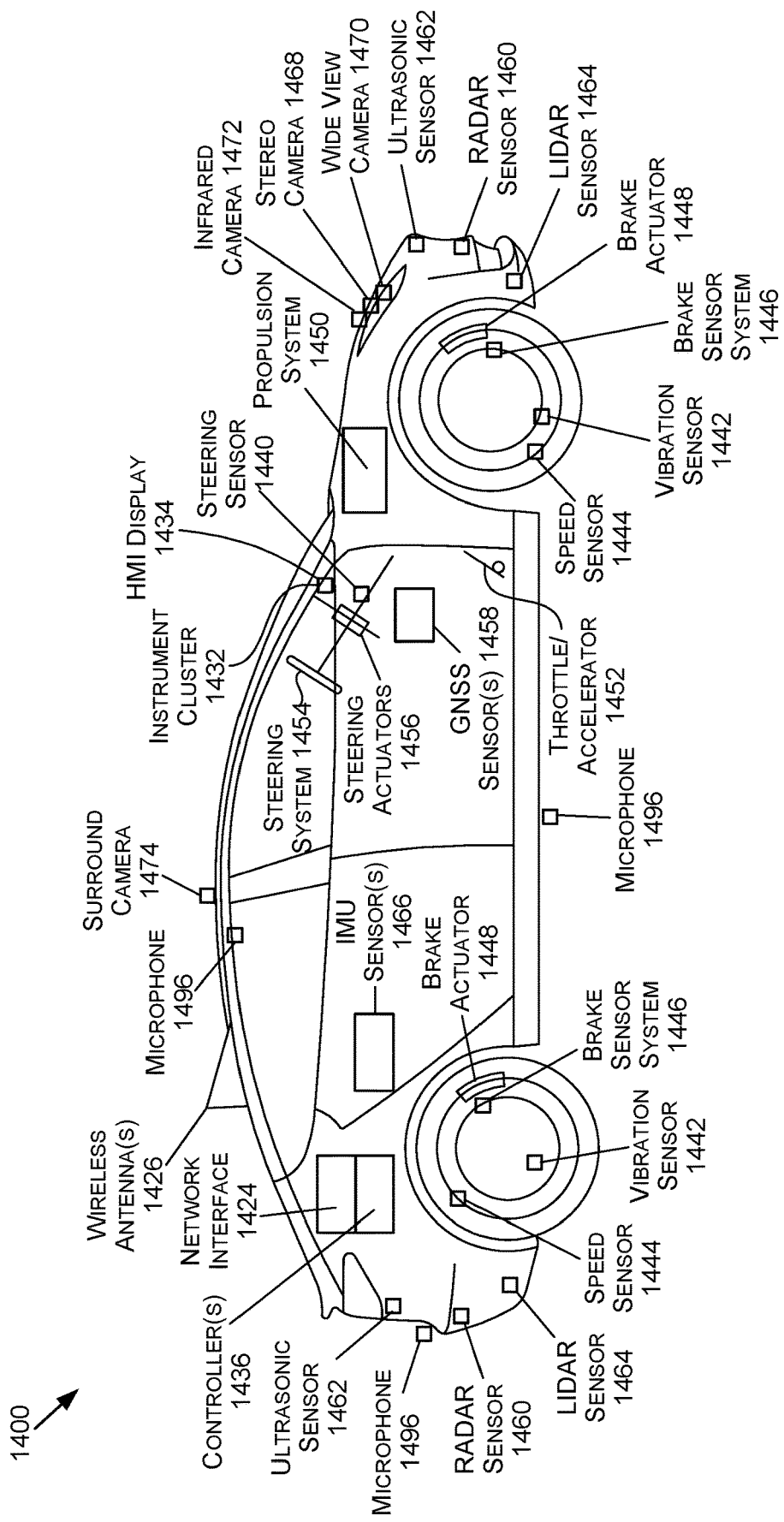
FIG. 14A is an illustration of an example autonomous vehicle, in accordance with some embodiments of the present disclosure.

FIG. 14A is an illustration of an example autonomous vehicle 1400, in accordance with some embodiments of the present disclosure. The autonomous vehicle 1400 (alternatively referred to herein as the "vehicle 1400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1400 may be capable of functionality in accordance with one or more of Level 3—Level 5 of the autonomous driving levels. For example, the vehicle 1400 may be capable of conditional automation (Level 3), high automation (Level 4), and/or full automation (Level 5), depending on the embodiment.

The vehicle 1400 may include components such as a chassis, a vehicle body, wheels (e.g., 2, 4, 6, 8, 18, etc.), tires, axles, and other components of a vehicle. The vehicle 1400 may include a propulsion system 1450, such as an internal combustion engine, hybrid electric power plant, an all-electric engine, and/or another propulsion system type. The propulsion system 1450 may be connected to a drive train of the vehicle 1400, which may include a transmission, to enable the propulsion of the vehicle 1400. The propulsion system 1450 may be controlled in response to receiving signals from the throttle/accelerator 1452.

A steering system 1454, which may include a steering wheel, may be used to steer the vehicle 1400 (e.g., along a desired path or route) when the propulsion system 1450 is operating (e.g., when the vehicle is in motion). The steering system 1454 may receive signals from a steering actuator 1456. The steering wheel may be optional for full automation (Level 5) functionality.

The brake sensor system 1446 may be used to operate the vehicle brakes in response to receiving signals from the brake actuators 1448 and/or brake sensors.

Controller(s) 1436, which may include one or more system on chips (SoCs) 1404 (FIG. 14C) and/or GPU(s), may provide signals (e.g., representative of commands) to one or more components and/or systems of the vehicle 1400. For example, the controller(s) may send signals to operate the vehicle brakes via one or more brake actuators 1448, to operate the steering system 1454 via one or more steering actuators 1456, to operate the propulsion system 1450 via one or more throttle/accelerators 1452. The controller(s) 1436 may include one or more onboard (e.g., integrated) computing devices (e.g., supercomputers) that process sensor signals, and output operation commands (e.g., signals representing commands) to enable autonomous driving and/or to assist a human driver in driving the vehicle 1400. The controller(s) 1436 may include a first controller 1436 for autonomous driving functions, a second controller 1436 for functional safety functions, a third controller 1436 for artificial intelligence functionality (e.g., computer vision), a fourth controller 1436 for infotainment functionality, a fifth controller 1436 for redundancy in emergency conditions, and/or other controllers. In some examples, a single controller 1436 may handle two or more of the above functionalities, two or more controllers 1436 may handle a single functionality, and/or any combination thereof.

The controller(s) 1436 may provide the signals for controlling one or more components and/or systems of the vehicle 1400 in response to sensor data received from one or more sensors (e.g., sensor inputs). The sensor data may be received from, for example and without limitation, global navigation satellite systems sensor(s) 1458 (e.g., Global Positioning System sensor(s)), RADAR sensor(s) 1460, ultrasonic sensor(s) 1462, LIDAR sensor(s) 1464, inertial measurement unit (IMU) sensor(s) 1466 (e.g., accelerometer(s), gyroscope(s), magnetic compass(es), magnetometer(s), etc.), microphone(s) 1496, stereo camera(s) 1468, wide-view camera(s) 1470 (e.g., fisheye cameras), infrared camera(s) 1472, surround camera(s) 1474 (e.g., 360 degree cameras), long-range and/or mid-range camera(s) 1498, speed sensor(s) 1444 (e.g., for measuring the speed of the vehicle 1400), vibration sensor(s) 1442, steering sensor(s) 1440, brake sensor(s) (e.g., as part of the brake sensor system 1446), and/or other sensor types.

One or more of the controller(s) 1436 may receive inputs (e.g., represented by input data) from an instrument cluster 1432 of the vehicle 1400 and provide outputs (e.g., represented by output data, display data, etc.) via a human-machine interface (HMI) display 1434, an audible annunciator, a loudspeaker, and/or via other components of the vehicle 1400. The outputs may include information such as vehicle velocity, speed, time, map data (e.g., the HD map 1422 of FIG. 14C), location data (e.g., the vehicle's 1400 location, such as on a map), direction, location of other vehicles (e.g., an occupancy grid), information about objects and status of objects as perceived by the controller(s) 1436, etc. For example, the HMI display 1434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1400 further includes a network interface 1424 which may use one or more wireless antenna(s) 1426 and/or modem(s) to communicate over one or more networks. For example, the network interface 1424 may be capable of communication over LTE, WCDMA, UMTS, GSM, CDMA2000, etc. The wireless antenna(s) 1426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

Figure 14B:
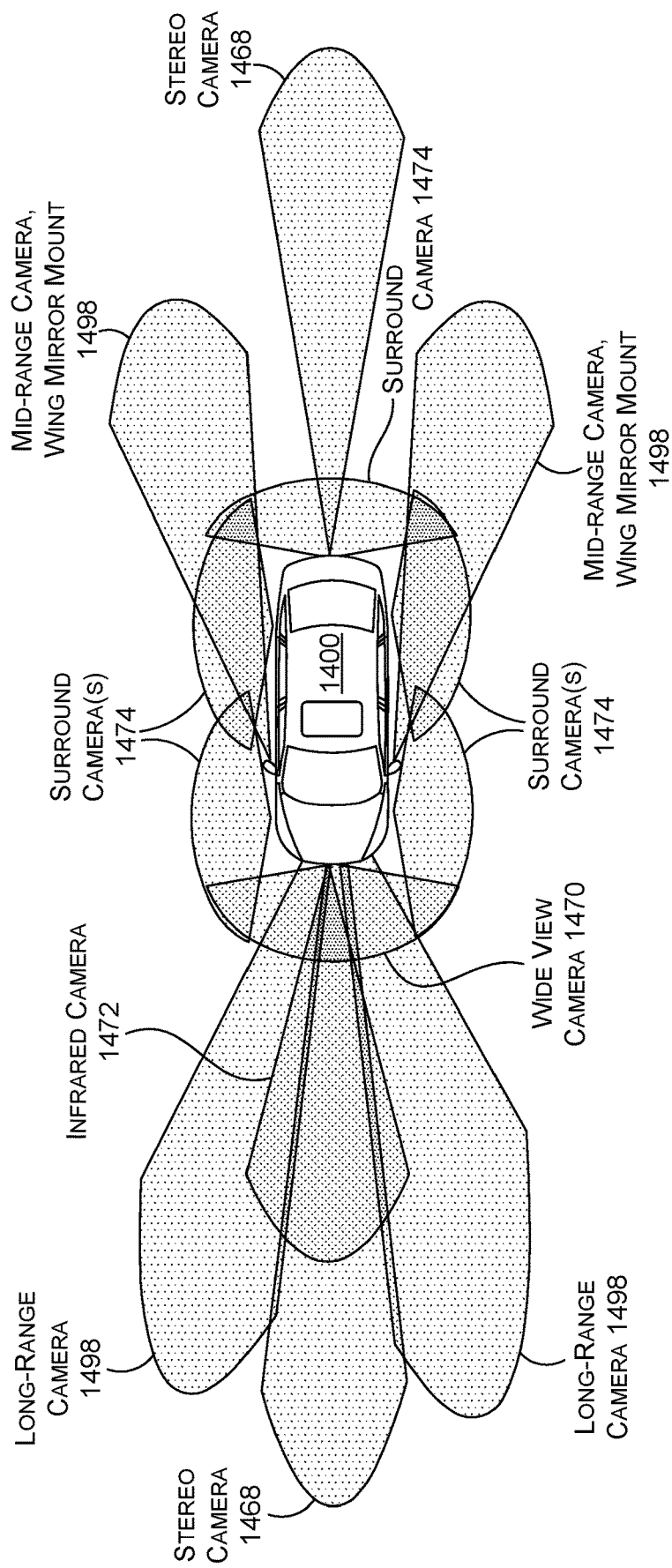
FIG. 14B is an example of camera locations and fields of view for the example autonomous vehicle of FIG. 14A, in accordance with some embodiments of the present disclosure.

FIG. 14B is an example of camera locations and fields of view for the example autonomous vehicle 1400 of FIG. 14A, in accordance with some embodiments of the present disclosure. The cameras and respective fields of view are one example embodiment and are not intended to be limiting. For example, additional and/or alternative cameras may be included and/or the cameras may be located at different locations on the vehicle 1400.

The camera types for the cameras may include, but are not limited to, digital cameras that may be adapted for use with the components and/or systems of the vehicle 1400. The camera(s) may operate at automotive safety integrity level (ASIL) B and/or at another ASIL. The camera types may be capable of any image capture rate, such as 60 frames per second (fps), 1420 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RB GC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1400 (e.g., front-facing cameras) may be used for surround view, to help identify forward facing paths and obstacles, as well aid in, with the help of one or more controllers 1436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1470 that may be used to perceive objects coming into view from the periphery (e.g., pedestrians, crossing traffic or bicycles). Although only one wide-view camera is illustrated in FIG. 14B, there may any number of wide-view cameras 1470 on the vehicle 1400. In addition, long-range camera(s) 1498 (e.g., a long-view stereo camera pair) may be used for depth-based object detection, especially for objects for which a neural network has not yet been trained. The long-range camera(s) 1498 may also be used for object detection and classification, as well as basic object tracking.

One or more stereo cameras 1468 may also be included in a front-facing configuration. The stereo camera(s) 1468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1468 may be used in addition to, or alternatively from, those described herein.

Cameras with a field of view that include portions of the environment to the side of the vehicle 1400 (e.g., side-view cameras) may be used for surround view, providing information used to create and update the occupancy grid, as well as to generate side impact collision warnings. For example, surround camera(s) 1474 (e.g., four surround cameras 1474 as illustrated in FIG. 14B) may be positioned to on the vehicle 1400. The surround camera(s) 1474 may include wide-view camera(s) 1470, fisheye camera(s), 360 degree camera(s), and/or the like. Four example, four fisheye cameras may be positioned on the vehicle's front, rear, and sides. In an alternative arrangement, the vehicle may use three surround camera(s) 1474 (e.g., left, right, and rear), and may leverage one or more other camera(s) (e.g., a forward-facing camera) as a fourth surround view camera.

Cameras with a field of view that include portions of the environment to the rear of the vehicle 1400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1498, stereo camera(s) 1468), infrared camera(s) 1472, etc.), as described herein.

Figure 14C:
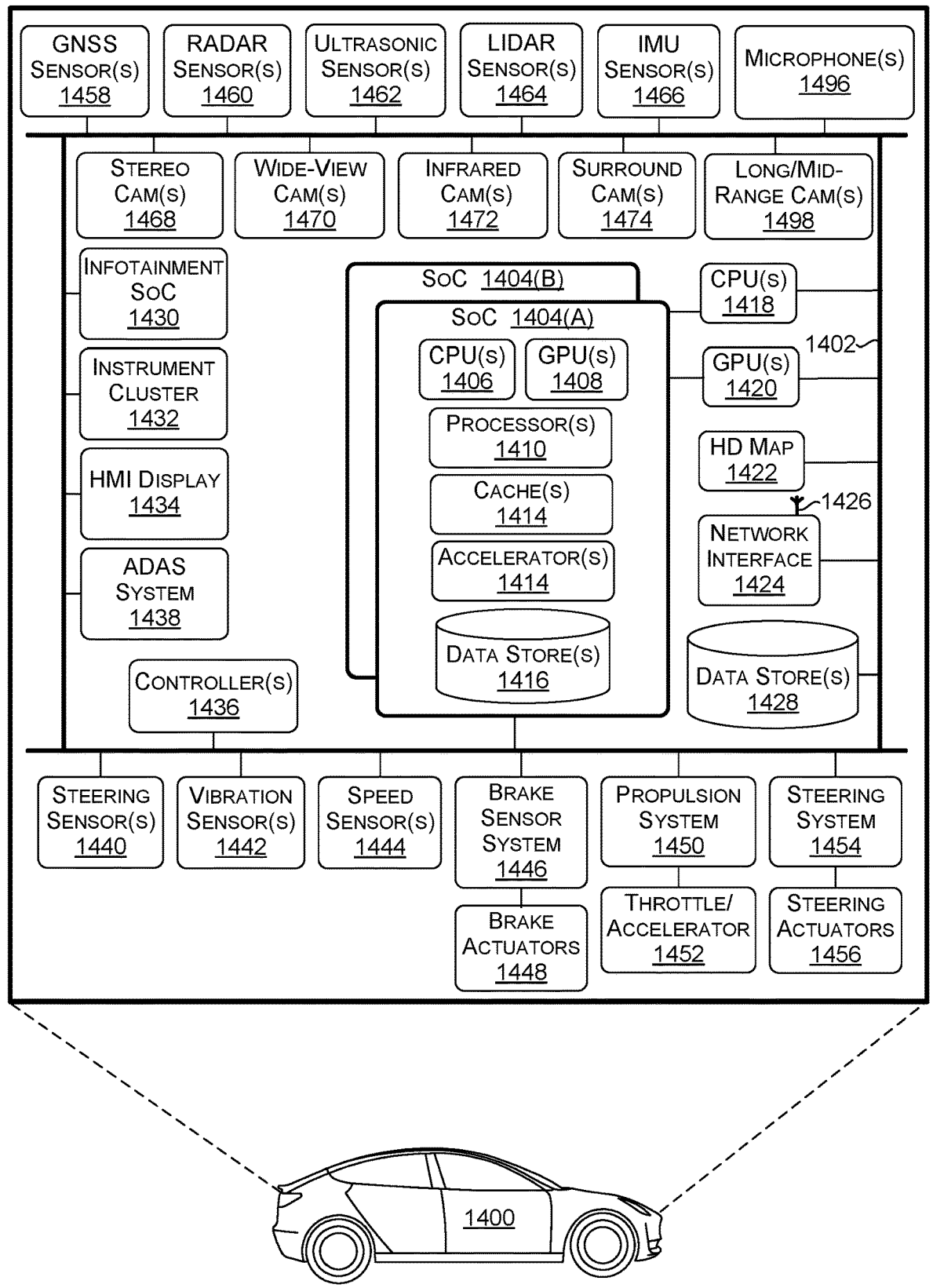
FIG. 14C is a block diagram of an example system architecture for the example autonomous vehicle of FIG. 14A, in accordance with some embodiments of the present disclosure.

FIG. 14C is a block diagram of an example system architecture for the example autonomous vehicle 1400 of FIG. 14A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1400 in FIG. 14C are illustrated as being connected via bus 1402. The bus 1402 may include a Controller Area Network (CAN) data interface (alternatively referred to herein as a "CAN bus"). A CAN may be a network inside the vehicle 1400 used to aid in control of various features and functionality of the vehicle 1400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1402 is described herein as being a CAN bus, this is not intended to be limiting. For example, in addition to, or alternatively from, the CAN bus, FlexRay and/or Ethernet may be used. Additionally, although a single line is used to represent the bus 1402, this is not intended to be limiting. For example, there may be any number of busses 1402, which may include one or more CAN busses, one or more FlexRay busses, one or more Ethernet busses, and/or one or more other types of busses using a different protocol. In some examples, two or more busses 1402 may be used to perform different functions, and/or may be used for redundancy. For example, a first bus 1402 may be used for collision avoidance functionality and a second bus 1402 may be used for actuation control. In any example, each bus 1402 may communicate with any of the components of the vehicle 1400, and two or more busses 1402 may communicate with the same components. In some examples, each SoC 1404, each controller 1436, and/or each computer within the vehicle may have access to the same input data (e.g., inputs from sensors of the vehicle 1400), and may be connected to a common bus, such the CAN bus.

The vehicle 1400 may include one or more controller(s) 1436, such as those described herein with respect to FIG. 14A. The controller(s) 1436 may be used for a variety of functions. The controller(s) 1436 may be coupled to any of the various other components and systems of the vehicle 1400, and may be used for control of the vehicle 1400, artificial intelligence of the vehicle 1400, infotainment for the vehicle 1400, and/or the like.

The vehicle 1400 may include a system(s) on a chip (SoC) 1404. The SoC 1404 may include CPU(s) 1406, GPU(s) 1408, processor(s) 1410, cache(s) 1412, accelerator(s) 1414, data store(s) 1416, and/or other components and features not illustrated. The SoC(s) 1404 may be used to control the vehicle 1400 in a variety of platforms and systems. For example, the SoC(s) 1404 may be combined in a system (e.g., the system of the vehicle 1400) with an HD map 1422 which may obtain map refreshes and/or updates via a network interface 1424 from one or more servers (e.g., server(s) 1478 of FIG. 14D).

The CPU(s) 1406 may include a CPU cluster or CPU complex (alternatively referred to herein as a "CCPLEX"). The CPU(s) 1406 may include multiple cores and/or L2 caches. For example, in some embodiments, the CPU(s) 1406 may include eight cores in a coherent multi-processor configuration. In some embodiments, the CPU(s) 1406 may include four dual-core clusters where each cluster has a dedicated L2 cache (e.g., a 2 MB L2 cache). The CPU(s) 1406 (e.g., the CCPLEX) may be configured to support simultaneous cluster operation enabling any combination of the clusters of the CPU(s) 1406 to be active at any given time.

The CPU(s) 1406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1408 may include an integrated GPU (alternatively referred to herein as an "iGPU"). The GPU(s) 1408 may be programmable and may be efficient for parallel workloads. The GPU(s) 1408, in some examples, may use an enhanced tensor instruction set. The GPU(s) 1408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1408 may include at least eight streaming microprocessors. The GPU(s) 1408 may use compute application programming interface(s) (API(s)). In addition, the GPU(s) 1408 may use one or more parallel computing platforms and/or programming models (e.g., NVIDIA's CUDA).

The GPU(s) 1408 may be power-optimized for best performance in automotive and embedded use cases. For example, the GPU(s) 1408 may be fabricated on a Fin field-effect transistor (FinFET). However, this is not intended to be limiting and the GPU(s) 1408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1408 to access the CPU(s) 1406 page tables directly. In such examples, when the GPU(s) 1408 memory management unit (MMU) experiences a miss, an address translation request may be transmitted to the CPU(s) 1406. In response, the CPU(s) 1406 may look in its page tables for the virtual-to-physical mapping for the address and transmits the translation back to the GPU(s) 1408. As such, unified memory technology may allow a single unified virtual address space for memory of both the CPU(s) 1406 and the GPU(s) 1408, thereby simplifying the GPU(s) 1408 programming and porting of applications to the GPU(s) 1408.

In addition, the GPU(s) 1408 may include an access counter that may keep track of the frequency of access of the GPU(s) 1408 to memory of other processors. The access counter may help ensure that memory pages are moved to the physical memory of the processor that is accessing the pages most frequently.

The SoC(s) 1404 may include any number of cache(s) 1412, including those described herein. For example, the cache(s) 1412 may include an L3 cache that is available to both the CPU(s) 1406 and the GPU(s) 1408 (e.g., that is connected both the CPU(s) 1406 and the GPU(s) 1408). The cache(s) 1412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1404 may include one or more accelerators 1414 (e.g., hardware accelerators, software accelerators, or a combination thereof). For example, the SoC(s) 1404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1408 and to off-load some of the tasks of the GPU(s) 1408 (e.g., to free up more cycles of the GPU(s) 1408 for performing other tasks). As an example, the accelerator(s) 1414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1408, and by using an inference accelerator, for example, a designer may target either the DLA(s) or the GPU(s) 1408 for any function. For example, the designer may focus processing of CNNs and floating point operations on the DLA(s) and leave other functions to the GPU(s) 1408 and/or other accelerator(s) 1414.

The accelerator(s) 1414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1414 (e.g., the hardware acceleration cluster) may include a computer vision network on-chip and SRAM, for providing a high-bandwidth, low latency SRAM for the accelerator(s) 1414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1466 output that correlates with the vehicle 1400 orientation, distance, 3D location estimates of the object obtained from the neural network and/or other sensors (e.g., LIDAR sensor(s) 1464 or RADAR sensor(s) 1460), among others.

The SoC(s) 1404 may include data store(s) 1416 (e.g., memory). The data store(s) 1416 may be on-chip memory of the SoC(s) 1404, which may store neural networks to be executed on the GPU and/or the DLA. In some examples, the data store(s) 1416 may be large enough in capacity to store multiple instances of neural networks for redundancy and safety. The data store(s) 1412 may comprise L2 or L3 cache(s) 1412. Reference to the data store(s) 1416 may include reference to the memory associated with the PVA, DLA, and/or other accelerator(s) 1414, as described herein.

The SoC(s) 1404 may include one or more processor(s) 1410 (e.g., embedded processors). The processor(s) 1410 may include a boot and power management processor that may be a dedicated processor and subsystem to handle boot power and management functions and related security enforcement. The boot and power management processor may be a part of the SoC(s) 1404 boot sequence and may provide runtime power management services. The boot power and management processor may provide clock and voltage programming, assistance in system low power state transitions, management of SoC(s) 1404 thermals and temperature sensors, and/or management of the SoC(s) 1404 power states. Each temperature sensor may be implemented as a ring-oscillator whose output frequency is proportional to temperature, and the SoC(s) 1404 may use the ring-oscillators to detect temperatures of the CPU(s) 1406, GPU(s) 1408, and/or accelerator(s) 1414. If temperatures are determined to exceed a threshold, the boot and power management processor may enter a temperature fault routine and put the SoC(s) 1404 into a lower power state and/or put the vehicle 1400 into a chauffeur to safe stop mode (e.g., bring the vehicle 1400 to a safe stop).

The processor(s) 1410 may further include a set of embedded processors that may serve as an audio processing engine. The audio processing engine may be an audio subsystem that enables full hardware support for multi-channel audio over multiple interfaces, and a broad and flexible range of audio 110 interfaces. In some examples, the audio processing engine is a dedicated processor core with a digital signal processor with dedicated RAM.

The processor(s) 1410 may further include an always on processor engine that may provide necessary hardware features to support low power sensor management and wake use cases. The always on processor engine may include a processor core, a tightly coupled RAM, supporting peripherals (e.g., timers and interrupt controllers), various 110 controller peripherals, and routing logic.

The processor(s) 1410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1410 may further include a real-time camera engine that may include a dedicated processor subsystem for handling real-time camera management.

The processor(s) 1410 may further include a high-dynamic range signal processor that may include an image signal processor that is a hardware engine that is part of the camera processing pipeline.

The processor(s) 1410 may include a video image compositor that may be a processing block (e.g., implemented on a microprocessor) that implements video post-processing functions needed by a video playback application to produce the final image for the player window. The video image compositor may perform lens distortion correction on wide-view camera(s) 1470, surround camera(s) 1474, and/or on in-cabin monitoring camera sensors. In-cabin monitoring camera sensor is preferably monitored by a neural network running on another instance of the Advanced SoC, config-ured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1408 is not required to continuously render new surfaces. Even when the GPU(s) 1408 is powered on and active doing 3D rendering, the video image compositor may be used to offload the GPU(s) 1408 to improve performance and responsiveness.

The SoC(s) 1404 may further include a mobile industry processor interface (MIPI) camera serial interface for receiving video and input from cameras, a high-speed interface, and/or a video input block that may be used for camera and related pixel input functions. The SoC(s) 1404 may further include an input/output controller(s) that may be controlled by software and may be used for receiving I/O signals that are uncommitted to a specific role.

The SoC(s) 1404 may further include a broad range of peripheral interfaces to enable communication with peripherals, audio codecs, power management, and/or other devices. The SoC(s) 1404 may be used to process data from cameras (e.g., connected over Gigabit Multimedia Serial Link and Ethernet), sensors (e.g., LIDAR sensor(s) 1464, RADAR sensor(s) 1460, etc. that may be connected over Ethernet), data from bus 1402 (e.g., speed of vehicle 1400, steering wheel position, etc.), data from GNSS sensor(s) 1458 (e.g., connected over Ethernet or CAN bus). The SoC(s) 1404 may further include dedicated high-performance mass storage controllers that may include their own DMA engines, and that may be used to free the CPU(s) 1406 from routine data management tasks.

The SoC(s) 1404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1404 may be faster, more reliable, and even more energy-efficient and space-efficient than conventional systems. For example, the accelerator(s) 1414, when combined with the CPU(s) 1406, the GPU(s) 1408, and the data store(s) 1416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1408.

In some examples, a CNN for facial recognition and vehicle owner identification may use data from camera sensors to identify the presence of an authorized driver and/or owner of the vehicle 1400. The always on sensor processing engine may be used to unlock the vehicle when the owner approaches the driver door and turn on the lights, and, in security mode, to disable the vehicle when the owner leaves the vehicle. In this way, the SoC(s) 1404 provide for security against theft and/or carjacking.

In another example, a CNN for emergency vehicle detection and identification may use data from microphones 1496 to detect and identify emergency vehicle sirens. In contrast to conventional systems, that use general classifiers to detect sirens and manually extract features, the SoC(s) 1404 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1462, until the emergency vehicle(s) passes.

The vehicle may include a CPU(s) 1418 (e.g., discrete CPU(s), or dCPU(s)), that may be coupled to the SoC(s) 1404 via a high-speed interconnect (e.g., PCIe). The CPU(s) 1418 may include an X86 processor, for example. The CPU(s) 1418 may be used to perform any of a variety of functions, including arbitrating potentially inconsistent results between ADAS sensors and the SoC(s) 1404, and/or monitoring the status and health of the controller(s) 1436 and/or infotainment SoC 1430, for example.

The vehicle 1400 may include a GPU(s) 1420 (e.g., discrete GPU(s), or dGPU(s)), that may be coupled to the SoC(s) 1404 via a high-speed interconnect (e.g., NVIDIA's NVLINK). The GPU(s) 1420 may provide additional artificial intelligence functionality, such as by executing redundant and/or different neural networks, and may be used to train and/or update neural networks based on input (e.g., sensor data) from sensors of the vehicle 1400.

The vehicle 1400 may further include the network interface 1424 which may include one or more wireless antennas 1426 (e.g., one or more wireless antennas for different communication protocols, such as a cellular antenna, a Bluetooth antenna, etc.). The network interface 1424 may be used to enable wireless connectivity over the Internet with the cloud (e.g., with the server(s) 1478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1400 information about vehicles in proximity to the vehicle 1400 (e.g., vehicles in front of, on the side of, and/or behind the vehicle 1400). This functionality may be part of a cooperative adaptive cruise control functionality of the vehicle 1400.

The network interface 1424 may include a SoC that provides modulation and demodulation functionality and enables the controller(s) 1436 to communicate over wireless networks. The network interface 1424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1400 may further include data store(s) 1428 which may include off-chip (e.g., off the SoC(s) 1404) storage. The data store(s) 1428 may include one or more storage elements including RAM, SRAM, DRAM, VRAM, Flash, hard disks, and/or other components and/or devices that may store at least one bit of data.

The vehicle 1400 may further include GNSS sensor(s) 1458. The GNSS sensor(s) 1458 (e.g., GPS and/or assisted GPS sensors), to assist in mapping, perception, occupancy grid generation, and/or path planning functions. Any number of GNSS sensor(s) 1458 may be used, including, for example and without limitation, a GPS using a USB connector with an Ethernet to Serial (RS-232) bridge.

The vehicle 1400 may further include RADAR sensor(s) 1460. The RADAR sensor(s) 1460 may be used by the vehicle 1400 for long-range vehicle detection, even in darkness and/or severe weather conditions. RADAR functional safety levels may be ASIL B. The RADAR sensor(s) 1460 may use the CAN and/or the bus 1402 (e.g., to transmit data generated by the RADAR sensor(s) 1460) for control and to access object tracking data, with access to Ethernet to access raw data in some examples. A wide variety of RADAR sensor types may be used. For example, and without limitation, the RADAR sensor(s) 1460 may be suitable for front, rear, and side RADAR use. In some example, Pulse Doppler RADAR sensor(s) are used.

The RADAR sensor(s) 1460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1400 surroundings at higher speeds with minimal interference from traffic in adjacent lanes. The other two antennae may expand the field of view, making it possible to quickly detect vehicles entering or leaving the vehicle's 1400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1400 may further include ultrasonic sensor(s) 1462. The ultrasonic sensor(s) 1462, which may be positioned at the front, back, and/or the sides of the vehicle 1400, may be used for park assist and/or to create and update an occupancy grid. A wide variety of ultrasonic sensor(s) 1462 may be used, and different ultrasonic sensor(s) 1462 may be used for different ranges of detection (e.g., 2.5 m, 4 m). The ultrasonic sensor(s) 1462 may operate at functional safety levels of ASIL B.

The vehicle 1400 may include LIDAR sensor(s) 1464. The LIDAR sensor(s) 1464 may be used for object and pedestrian detection, emergency braking, collision avoidance, and/or other functions. The LIDAR sensor(s) 1464 may be functional safety level ASIL B. In some examples, the vehicle 1400 may include multiple LIDAR sensors 1464 (e.g., two, four, six, etc.) that may use Ethernet (e.g., to provide data to a Gigabit Ethernet switch).

In some examples, the LIDAR sensor(s) 1464 may be capable of providing a list of objects and their distances for a 360-degree field of view. Commercially available LIDAR sensor(s) 1464 may have an advertised range of approximately 1400 m, with an accuracy of 2 cm-3 cm, and with support for a 1400 Mbps Ethernet connection, for example. In some examples, one or more non-protruding LIDAR sensors 1464 may be used. In such examples, the LIDAR sensor(s) 1464 may be implemented as a small device that may be embedded into the front, rear, sides, and/or corners of the vehicle 1400. The LIDAR sensor(s) 1464, in such examples, may provide up to a 1420-degree horizontal and 35-degree vertical field-of-view, with a 200 m range even for low-reflectivity objects. Front-mounted LIDAR sensor(s) 1464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1464 may be less susceptible to motion blur, vibration, and/or shock.

The vehicle may further include IMU sensor(s) 1466. The IMU sensor(s) 1466 may be located at a center of the rear axle of the vehicle 1400, in some examples. The IMU sensor(s) 1466 may include, for example and without limitation, an accelerometer(s), a magnetometer(s), a gyroscope(s), a magnetic compass(es), and/or other sensor types. In some examples, such as in six-axis applications, the IMU sensor(s) 1466 may include accelerometers and gyroscopes, while in nine-axis applications, the IMU sensor(s) 1466 may include accelerometers, gyroscopes, and magnetometers.

In some embodiments, the IMU sensor(s) 1466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1466 may enable the vehicle 1400 to estimate heading without requiring input from a magnetic sensor by directly observing and correlating the changes in velocity from GPS to the IMU sensor(s) 1466. In some examples, the IMU sensor(s) 1466 and the GNSS sensor(s) 1458 may be combined in a single integrated unit.

The vehicle may include microphone(s) 1496 placed in and/or around the vehicle 1400. The microphone(s) 1496 may be used for emergency vehicle detection and identification, among other things.

The vehicle may further include any number of camera types, including stereo camera(s) 1468, wide-view camera(s) 1470, infrared camera(s) 1472, surround camera(s) 1474, long-range and/or mid-range camera(s) 1498, and/or other camera types. The cameras may be used to capture image data around an entire periphery of the vehicle 1400. The types of cameras used depends on the embodiments and requirements for the vehicle 1400, and any combination of camera types may be used to provide the necessary coverage around the vehicle 1400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 14A and FIG. 14B.

The vehicle 1400 may further include vibration sensor(s) 1442. The vibration sensor(s) 1442 may measure vibrations of components of the vehicle, such as the axle(s). For example, changes in vibrations may indicate a change in road surfaces. In another example, when two or more vibration sensors 1442 are used, the differences between the vibrations may be used to determine friction or slippage of the road surface (e.g., when the difference in vibration is between a power-driven axle and a freely rotating axle).

The vehicle 1400 may include an ADAS system 1438. The ADAS system 1438 may include a SoC, in some examples. The ADAS system 1438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1460, LIDAR sensor(s) 1464, and/or a camera(s). The ACC systems may include longitudinal ACC and/or lateral ACC. Longitudinal ACC monitors and controls the distance to the vehicle immediately ahead of the vehicle 1400 and automatically adjust the vehicle speed to maintain a safe distance from vehicles ahead. Lateral ACC performs distance keeping, and advises the vehicle 1400 to change lanes when necessary. Lateral ACC is related to other ADAS applications such as LCA and CWS.

CACC uses information from other vehicles that may be received via the network interface 1424 and/or the wireless antenna(s) 1426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1400), while the I2V communication concept provides information about traffic further ahead. CACC systems may include either or both I2V and V2V information sources. Given the information of the vehicles ahead of the vehicle 1400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1400 if the vehicle 1400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1400 is backing up. Some RCTW systems include AEB to ensure that the vehicle brakes are applied to avoid a crash. RCTW systems may use one or more rear-facing RADAR sensor(s) 1460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1400, the vehicle 1400 itself must, in the case of conflicting results, decide whether to heed the result from a primary computer or a secondary computer (e.g., a first controller 1436 or a second controller 1436). For example, in some embodiments, the ADAS system 1438 may be a backup and/or secondary computer for providing perception information to a backup computer rationality module. The backup computer rationality monitor may run a redundant diverse software on hardware components to detect faults in perception and dynamic driving tasks. Outputs from the ADAS system 1438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1404.

In other examples, ADAS system 1438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1438 may be fed into the primary computer's perception block and/or the primary computer's dynamic driving task block. For example, if the ADAS system 1438 indicates a forward crash warning due to an object immediately ahead, the perception block may use this information when identifying objects. In other examples, the secondary computer may have its own neural network which is trained and thus reduces the risk of false positives, as described herein.

The vehicle 1400 may further include the infotainment SoC 1430 (e.g., an in-vehicle infotainment system (IVI)). Although illustrated and described as a SoC, the infotainment system may not be a SoC, and may include two or more discrete components. The infotainment SoC 1430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1400. For example, the infotainment SoC 1430 may radios, disk players, navigation systems, video players, USB and Bluetooth connectivity, carputers, in-car entertainment, Wi-Fi, steering wheel audio controls, hands free voice control, a heads-up display (HUD), an HMI display 1434, a telematics device, a control panel (e.g., for controlling and/or interacting with various components, features, and/or systems), and/or other components. The infotainment SoC 1430 may further be used to provide information (e.g., visual and/or audible) to a user(s) of the vehicle, such as information from the ADAS system 1438, autonomous driving information such as planned vehicle maneuvers, trajectories, surrounding environment information (e.g., intersection information, vehicle information, road information, etc.), and/or other information.

The infotainment SoC 1430 may include GPU functionality. The infotainment SoC 1430 may communicate over the bus 1402 (e.g., CAN bus, Ethernet, etc.) with other devices, systems, and/or components of the vehicle 1400. In some examples, the infotainment SoC 1430 may be coupled to a supervisory MCU such that the GPU of the infotainment system may perform some self-driving functions in the event that the primary controller(s) 1436 (e.g., the primary and/or backup computers of the vehicle 1400) fail. In such an example, the infotainment SoC 1430 may put the vehicle 1400 into a chauffeur to safe stop mode, as described herein.

The vehicle 1400 may further include an instrument cluster 1432 (e.g., a digital dash, an electronic instrument cluster, a digital instrument panel, etc.). The instrument cluster 1432 may include a controller and/or supercomputer (e.g., a discrete controller or supercomputer). The instrument cluster 1432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1430 and the instrument cluster 1432. In other words, the instrument cluster 1432 may be included as part of the infotainment SoC 1430, or vice versa.

Figure 14D:
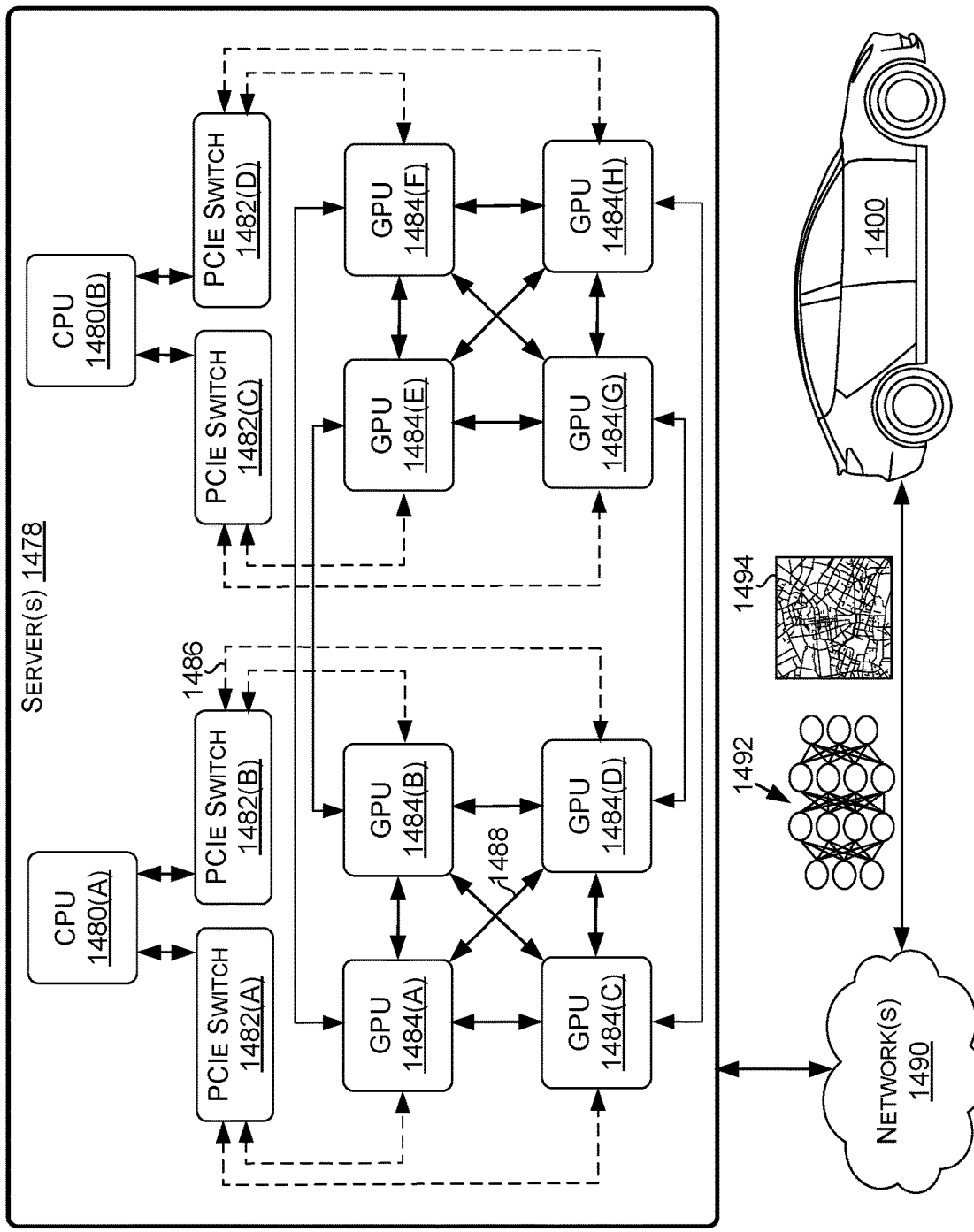
FIG. 14D is a system diagram for communication between cloud-based server(s) and the example autonomous vehicle of FIG. 14A, in accordance with some embodiments of the present disclosure.

FIG. 14D is a system diagram for communication between cloud-based server(s) and the example autonomous vehicle 1400 of FIG. 14A, in accordance with some embodiments of the present disclosure. The system 1476 may include server(s) 1478, network(s) 1490, and vehicles, including the vehicle 1400. The server(s) 1478 may include a plurality of GPUs 1484(A)-1484(H) (collectively referred to herein as GPUs 1484), PCIe switches 1482(A)-1482(H) (collectively referred to herein as PCIe switches 1482), and/or CPUs 1480(A)-1480(B) (collectively referred to herein as CPUs 1480). The GPUs 1484, the CPUs 1480, and the PCIe switches may be interconnected with high-speed interconnects such as, for example and without limitation, NVLink interfaces 1488 developed by NVIDIA and/or PCIe connections 1486. In some examples, the GPUs 1484 are connected via NVLink and/or NVSwitch SoC and the GPUs 1484 and the PCIe switches 1482 are connected via PCIe interconnects. Although eight GPUs 1484, two CPUs 1480, and two PCIe switches are illustrated, this is not intended to be limiting. Depending on the embodiment, each of the server(s) 1478 may include any number of GPUs 1484, CPUs 1480, and/or PCIe switches. For example, the server(s) 1478 may each include eight, sixteen, thirty-two, and/or more GPUs 1484.

The server(s) 1478 may receive, over the network(s) 1490 and from the vehicles, image data representative of images showing unexpected or changed road conditions, such as recently commenced road-work. The server(s) 1478 may transmit, over the network(s) 1490 and to the vehicles, neural networks 1492, updated neural networks 1492, and/or map information 1494, including information regarding traffic and road conditions. The updates to the map information 1494 may include updates for the HD map 1422, such as information regarding construction sites, potholes, detours, flooding, and/or other obstructions. In some examples, the neural networks 1492, the updated neural networks 1492, and/or the map information 1494 may have resulted from new training and/or experiences represented in data received from any number of vehicles in the environment, and/or based on training performed at a datacenter (e.g., using the server(s) 1478 and/or other servers).

The server(s) 1478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1490, and/or the machine learning models may be used by the server(s) 1478 to remotely monitor the vehicles.

In some examples, the server(s) 1478 may receive data from the vehicles and apply the data to up-to-date real-time neural networks for real-time intelligent inferencing. The server(s) 1478 may include deep-learning supercomputers and/or dedicated AI computers powered by GPU(s) 1484, such as a DGX and DGX Station machines developed by NVIDIA. However, in some examples, the server(s) 1478 may include deep learning infrastructure that use only CPU-powered datacenters.

The deep-learning infrastructure of the server(s) 1478 may be capable of fast, real-time inferencing, and may use that capability to evaluate and verify the health of the processors, software, and/or associated hardware in the vehicle 1400. For example, the deep-learning infrastructure may receive periodic updates from the vehicle 1400, such as a sequence of images and/or objects that the vehicle 1400 has located in that sequence of images (e.g., via computer vision and/or other machine learning object classification techniques). The deep-learning infrastructure may run its own neural network to identify the objects and compare them with the objects identified by the vehicle 1400 and, if the results do not match and the infrastructure concludes that the AI in the vehicle 1400 is malfunctioning, the server(s) 1478 may transmit a signal to the vehicle 1400 instructing a fail-safe computer of the vehicle 1400 to assume control, notify the passengers, and complete a safe parking maneuver.

For inferencing, the server(s) 1478 may include the GPU(s) 1484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 15:
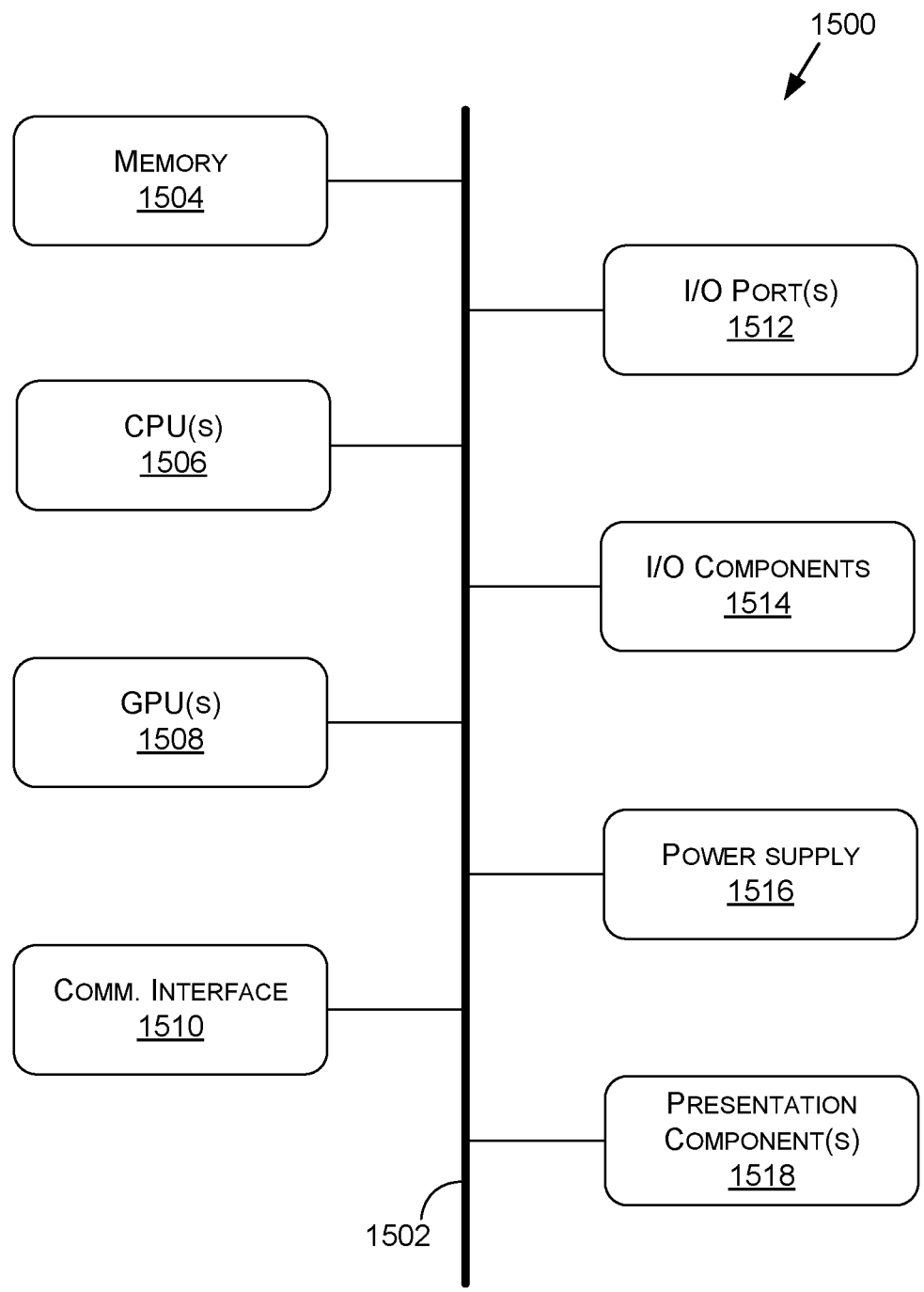
FIG. 15 is a block diagram of an example computing device suitable for use in implementing some embodiments of the present disclosure.

FIG. 15 is a block diagram of an example computing device 1500 suitable for use in implementing some embodiments of the present disclosure. Computing device 1500 may include a bus 1502 that directly or indirectly couples the following devices: memory 1504, one or more central processing units (CPUs) 1506, one or more graphics processing units (GPUs) 1508, a communication interface 1510, input/output (I/O) ports 1512, input/output components 1514, a power supply 1516, and one or more presentation components 1518 (e.g., display(s)).

Although the various blocks of FIG. 15 are shown as connected via the bus 1502 with lines, this is not intended to be limiting and is for clarity only. For example, in some embodiments, a presentation component 1518, such as a display device, may be considered an I/O component 1514 (e.g., if the display is a touch screen). As another example, the CPUs 1506 and/or GPUs 1508 may include memory (e.g., the memory 1504 may be representative of a storage device in addition to the memory of the GPUs 1508, the CPUs 1506, and/or other components). In other words, the computing device of FIG. 15 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 15.

The bus 1502 may represent one or more busses, such as an address bus, a data bus, a control bus, or a combination thereof. The bus 1502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1504 may include any of a variety of computer-readable media. The computer-readable media may be any available media that may be accessed by the computing device 1500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1506 may be configured to execute the computer-readable instructions to control one or more components of the computing device 1500 to perform one or more of the methods and/or processes described herein. The CPU(s) 1506 may each include one or more cores (e.g., one, two, four, eight, twenty-eight, seventy-two, etc.) that are capable of handling a multitude of software threads simultaneously. The CPU(s) 1506 may include any type of processor, and may include different types of processors depending on the type of computing device 1500 implemented (e.g., processors with fewer cores for mobile devices and processors with more cores for servers). For example, depending on the type of computing device 1500, the processor may be an ARM processor implemented using Reduced Instruction Set Computing (RISC) or an x86 processor implemented using Complex Instruction Set Computing (CISC). The computing device 1500 may include one or more CPUs 1506 in addition to one or more microprocessors or supplementary co-processors, such as math co-processors.

The GPU(s) 1508 may be used by the computing device 1500 to render graphics (e.g., 3D graphics). The GPU(s) 1508 may include hundreds or thousands of cores that are capable of handling hundreds or thousands of software threads simultaneously. The GPU(s) 1508 may generate pixel data for output images in response to rendering commands (e.g., rendering commands from the CPU(s) 1506 received via a host interface). The GPU(s) 1508 may include graphics memory, such as display memory, for storing pixel data. The display memory may be included as part of the memory 1504. The GPU(s) 708 may include two or more GPUs operating in parallel (e.g., via a link). When combined together, each GPU 1508 may generate pixel data for different portions of an output image or for different output images (e.g., a first GPU for a first image and a second GPU for a second image). Each GPU may include its own memory, or may share memory with other GPUs.

In examples where the computing device 1500 does not include the GPU(s) 1508, the CPU(s) 1506 may be used to render graphics.

The communication interface 1510 may include one or more receivers, transmitters, and/or transceivers that enable the computing device 700 to communicate with other computing devices via an electronic communication network, included wired and/or wireless communications. The communication interface 1510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1512 may enable the computing device 1500 to be logically coupled to other devices including the I/O components 1514, the presentation component(s) 1518, and/or other components, some of which may be built in to (e.g., integrated in) the computing device 1500. Illustrative I/O components 1514 include a microphone, mouse, keyboard, joystick, game pad, game controller, satellite dish, scanner, printer, wireless device, etc. The I/O components 1514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1500. The computing device 1500 may be include depth cameras, such as stereoscopic camera systems, infrared camera systems, RGB camera systems, touchscreen technology, and combinations of these, for gesture detection and recognition. Additionally, the computing device 1500 may include accelerometers or gyroscopes (e.g., as part of an inertia measurement unit (IMU)) that enable detection of motion. In some examples, the output of the accelerometers or gyroscopes may be used by the computing device 1500 to render immersive augmented reality or virtual reality.

The power supply 1516 may include a hard-wired power supply, a battery power supply, or a combination thereof. The power supply 1516 may provide power to the computing device 1500 to enable the components of the computing device 1500 to operate.

The presentation component(s) 1518 may include a display (e.g., a monitor, a touch screen, a television screen, a heads-up-display (HUD), other display types, or a combination thereof), speakers, and/or other presentation components. The presentation component(s) 1518 may receive data from other components (e.g., the GPU(s) 1508, the CPU(s) 1506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving image data representative of one or more images generated using one or more sensors of a machine;
computing, using one or more neural networks and based at least on the image data, an inverse of a time-to-collision (TTC); and
performing one or more operations by the machine based at least on the inverse of the TTC.

2. The method of claim 1, further comprising:
determining the TTC based at least on the inverse of the TTC,
wherein the performing the one or more operations is based at least on the TTC.

3. The method of claim 1, further comprising:
computing, using the one or more neural networks and based at least on the image data, a location associated with an object,
wherein the performing the one or more operations is further based at least on the location associated with the object.

4. The method of claim 1, further comprising:
computing, using the one or more neural networks and based at least on the image data, a velocity associated with an object,
wherein the performing the one or more operations is further based at least on the velocity associated with the object.

5. The method of claim 1, further comprising:
generating, based at least on the image data, one or more feature maps corresponding to the one or more images,
wherein the computing the inverse of the TTC is based at least on the one or more feature maps.

6. The method of claim 1, further comprising:
determining at least one of a frame rate associated with the image data or one or more timestamps indicating when the one or more images were generated,
wherein the computing the inverse of the TTC is further based at least on the at least one of the frame rate or the one or more timestamps.

7. The method of claim 1, wherein the one or more neural networks are trained using training data, the training data including:
second image data representative of one or more second images depicting a second object; and
data representative of at least one of a velocity associated with the second object, a second TTC associated with the second object, or an inverse of the second TTC associated with the second object.

8. The method of claim 7, wherein the training data is generated, at least, by:
receiving the second image data, the second image data generated over a period of time;
receiving sensor data generated during at least a portion of the period of time;
determining, based at least on the sensor data, the at least one of the velocity associated with the second object, the second TTC associated with the second object, or the inverse of the second TTC associated with the second object; and
generating the training data to include the second image data and the data representative of the at least one of the velocity associated with the second object, the second TTC associated with the second object, or the inverse of the second TTC associated with the second object.

9. A system comprising:
one or more processing units to:
receive image data representative of a sequence of images generated using one or more sensors of a machine;
compute, using one or more neural networks and based at least on the image data, an inverse of a time-to-collision (TTC); and
cause the machine to perform one or more operations based at least on the inverse of the TTC.

10. The system of claim 9, wherein the one or more processing units are further to:
determine the TTC based at least on the inverse of the TTC,
wherein the one or more operations are performed based at least on the TTC.

11. The system of claim 9, wherein the one or more processing units are further to:
compute, using the one or more neural networks and based at least on the image data, a location associated with an object,
wherein the one or more operations are further performed based at least on the location associated with the object.

12. The system of claim 9, wherein the one or more processing units are further to:
compute, using the one or more neural networks and based at least on the image data, a velocity associated with an object,
wherein the one or more operations are further performed based at least on the velocity associated with the object.

13. The system of claim 9, wherein the one or more processing units are further to:
generate, based at least on the image data, one or more feature maps corresponding to the sequence of images,
wherein the inverse of the TTC is computed based at least on the one or more feature maps.

14. The system of claim 9, wherein the one or more processing units are further to:
determine at least one of a frame rate associated with the image data or timestamps indicating when the sequence of images were generated,
wherein the inverse of the TTC is computed based at least on the at least one of the frame rate or the timestamps.

15. The system of claim 9, wherein the one or more neural networks are trained using:
second image data representative of a second sequence of images depicting a second object; and
data representative of least one of a velocity associated with the second object, a second TTC associated with the second object, or an inverse of the second TTC associated with the second object.

16. The system of claim 9, wherein the system is comprised in at least one of:
a control system for an autonomous or semi-autonomous machine;
a perception system for an autonomous or semi-autonomous machine;

a system for performing simulation operations;
a system for performing digital twin operations;
a system for performing light transport simulation;
a system for performing collaborative content creation for 3D assets;
a system for generating or presenting at least one of mixed reality content, virtual reality content, or augmented reality content;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

17. A processor comprising:
one or more processing units to cause a machine to perform one or more operations based at least on a time-to-collision (TTC) value, the TTC value determine from an inverse of the TTC value as computed using one or more neural networks and based at least on sensor data generated using one or more sensors of the machine.

18. The processor of claim 17, wherein the one or more operations are further performed based at least on a location of an object associated with the TTC value.

19. The processor of claim 17, wherein the inverse of the TTC value is further determined based at least on at least one of a frame rate associated with the sensor data or one or more timestamps indicating when one or more images represented by the sensor data were generated.

20. The processor of claim 17, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for generating or presenting at least one of mixed reality content, virtual reality content, or augmented reality content;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *